United States Patent
Qu et al.

(10) Patent No.: US 10,972,236 B2
(45) Date of Patent: Apr. 6, 2021

(54) SIGNAL TRANSMISSION METHOD, SIGNAL RECEPTION METHOD, APPARATUS, AND SYSTEM IN WIRELESS COMMUNICATION

(71) Applicant: HUAWEI TECHNOLOGIES CO., LTD., Guangdong (CN)

(72) Inventors: Bingyu Qu, Beijing (CN); Hao Sun, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 17 days.

(21) Appl. No.: 16/563,368

(22) Filed: Sep. 6, 2019

(65) Prior Publication Data

US 2020/0007284 A1    Jan. 2, 2020

Related U.S. Application Data

(63) Continuation of application No. PCT/CN2018/079878, filed on Mar. 21, 2018.

(30) Foreign Application Priority Data

Mar. 24, 2017   (CN) .......................... 201710199625.9

(51) Int. Cl.
*H04L 5/00* (2006.01)
*H04L 27/26* (2006.01)

(52) U.S. Cl.
CPC .......... *H04L 5/0044* (2013.01); *H04L 5/0007* (2013.01); *H04L 27/2607* (2013.01); *H04L 27/2614* (2013.01); *H04L 27/2628* (2013.01)

(58) Field of Classification Search
CPC ............. H04L 27/2614; H04L 27/2621; H04L 27/2607; H04L 5/0007; H04L 5/0044; H04L 27/2628
See application file for complete search history.

(56) References Cited

U.S. PATENT DOCUMENTS 8,194,764 B2    6/2012 Honda et al.
2011/0122938 A1*   5/2011 Kameya ............... H04L 27/263
                                                375/228

(Continued)

FOREIGN PATENT DOCUMENTS

| CN | 101635980 A | 1/2010 |
| CN | 101729212 A | 6/2010 |
| CN | 105515713 A | 4/2016 |

OTHER PUBLICATIONS

Zte et al: "UL Control Structure",3GPP DRAFT; R1-1700261, vol. RAN WG1, No. Spokane, USA; Jan. 16-20, 2017, Jan. 16, 2017, XP051207799, 6 pages.

(Continued)

*Primary Examiner* — Brian D Nguyen
(74) *Attorney, Agent, or Firm* — Womble Bond Dickinson (US) LLP

(57) ABSTRACT

This application relates to the field of wireless communications technologies, and in particular, to a data processing method, apparatus, and system. This application provides a data processing method. A transmit device uses a sequence to carry data and a reference signal. The transmit device carries the two channels of data on an odd element and an even element of the sequence, respectively. The transmit device successively maps the sequence that carries the two channels of data to allocated subcarriers, and then sends the data in an orthogonal frequency division multiplexing (OFDM) manner. This application is intended to decrease cubic metric (CM)/peak-to-average ratio of a transmitted signal of an orthogonal frequency division multiplexing OFDM system through sequence design and mapping of the two channels of data to subcarriers, thereby improving link quality of an entire transmission system.

12 Claims, 9 Drawing Sheets

(56) References Cited

U.S. PATENT DOCUMENTS

| | | | |
|---|---|---|---|
| 2015/0195115 A1 | 7/2015 | Yu et al. | |
| 2015/0195840 A1* | 7/2015 | Ahn | H04L 27/2636 |
| | | | 370/329 |
| 2016/0352463 A1* | 12/2016 | Vojcic | H04L 27/261 |
| 2017/0026922 A1* | 1/2017 | Kim | H04L 5/0053 |
| 2017/0257249 A1* | 9/2017 | Hong | H04L 27/261 |
| 2017/0359140 A1 | 12/2017 | Yuan et al. | |
| 2018/0324485 A1* | 11/2018 | Kim | H04N 21/4302 |
| 2019/0014547 A1* | 1/2019 | Kim | H04L 27/2675 |

OTHER PUBLICATIONS

3rd Generation Partnership Project;Technical Specification Group Radio Access Network; "36.211 v12.9.0 Evolved Universal Terrestrial Radio Access (E-UTRA);Physical channels and modulation", 3GPP, Mar. 23, 2017, XP002796971, 4 pages.

\* cited by examiner

SIGNAL TRANSMISSION METHOD, SIGNAL RECEPTION METHOD, APPARATUS, AND SYSTEM IN WIRELESS COMMUNICATION

CROSS-REFERENCE TO RELATED APPLICATIONS

This application is a continuation of International Application No. PCT/CN2018/079878, filed on Mar. 21, 2018, which claims priority to Chinese Patent Application No. 201710199625.9, filed on Mar. 24, 2017. The disclosures of the aforementioned applications are hereby incorporated by reference in their entireties.

TECHNICAL FIELD

This application relates to the field of wireless communications technologies, and in particular, to a signal transmission method, signal reception method, apparatus, and system in a wireless communications system.

BACKGROUND

Technologies based on orthogonal frequency division multiplexing (OFDM) have advantages in aspects such as eliminating multi-path interference and being compatible with multiple-input multiple-output (MIMO). Currently, such technologies are employed by most present wireless communications systems, such as long term evolution (LTE) and worldwide interoperability for microwave access (WiMAX) systems.

A next-generation communications system, such as the 5th generation mobile communication (5G), allows a physical uplink control channel (PUCCH) to be sent together with a reference signal (RS) and uplink control information (UCI) on an OFDM symbol. Alternatively, two signals need to be transmitted, and information carried on each signal is modulated to be transmitted on respective sequence elements. If the foregoing two signals are still carried by a sequence in a LTE system, cubic metric (CM)/peak-to-average ratio is increased. However, CM causes a transmitted signal to be distorted when the signal passes through a power amplifier (PA), and extra error vector magnitude (EVM) is generated at a transmit end, which finally lowers demodulation performance of a receive end. To reduce the EVM of a transmitted signal, actual transmit power usually needs to be reduced, but reduction of the transmit power also lowers the demodulation performance of the receive end. Alternatively, a high peak-to-average ratio (PAPR) also decreases the transmit power, and therefore lowers the demodulation performance.

Therefore, a low-CM/PAPR signal transmission method based on an OFDM system is desired to improve link quality.

SUMMARY

This specification describes a signal transmission method, signal reception method, apparatus, and system used in wireless communication. In this application, a transmit device uses a sequence to carry data and a reference signal. The transmit device carries the two channels of data on an odd element and an even element of the sequence, respectively. The transmit device successively maps the sequence that carries the two channels of data to allocated subcarriers, and then sends the data in an OFDM manner. This application is intended to decrease the CM/peak-to-average ratio of a transmitted signal of an OFDM system through sequence design and mapping of the two channels of data to subcarriers, thereby improving link quality of an entire transmission system.

According to one embodiment, this application provides a signal transmission method in wireless communication. This method includes:

determining a sequence $\{f_n\}$ that includes $2 \times N$ elements, where $f_n$ is an element of $\{f_n\}$, N is a positive integer and an even number, n is an integer, and $0 \leq n \leq 2 \times N - 1$; and mapping the sequence $\{f_n\}$ to $2 \times N$ subcarriers;

where the sequence $\{f_n\}$ is as follows:

when n is an odd number, $f_n = A_1 \cdot x_n \cdot \exp(2\pi \cdot j \cdot \alpha \cdot n)$;

when n is an even number, $f_n = A_2 \cdot x_n \cdot \exp(2\pi j \cdot \alpha \cdot n)$; where $A_1$ and $A_2$ are non-zero complex numbers, $\alpha$ is a real number, $j = \sqrt{-1}$, $\exp(j \times h)$ represents $e^{j \times h}$, and h is any real number; and $\{x_n\}$ is a sequence including $x_n$, and meets at least one of the following conditions:

condition 1: when n is an even number greater than or equal to 0 and less than or equal to N−1, $$x_{n+N} = a \times j \times x_n;$$

when n is an odd number greater than or equal to 0 and less than or equal to N−1, $$x_{n+N} = a \times j \times x_n;$$

where a=1 or 1, $j = \sqrt{-1}$ and N is a positive integer and an even number; and condition 2: when N=6, $$x_{2n+6} = a_n \cdot x_{2n}, \text{ and}$$

$$x_{2n+1+6} = b_n \cdot x_{2n+1},$$

where
$$\begin{aligned}a_n &= c \cdot \exp(\pi \cdot j \cdot y_n / 4) \\ b_n &= c \cdot \exp(\pi \cdot j \cdot y_{n+3} / 4)\end{aligned},$$

c is a non-zero complex number, $0 \leq n \leq 2$, and $\{y_0\ y_1\ y_2\ y_3\ y_4\ y_5\}$ is one of the following sequences:
{2 0 6 2 4 6},
{6 0 2 6 4 2},
{0 6 4 4 2 0},
{2 6 6 4 4 0},
{6 2 2 4 4 0},
{6 6 2 4 0 0},
{2 2 6 4 0 0},
{4 2 0 4 6 0},
{0 2 4 0 6 4},
{2 0 6 6 4 2},
{4 0 0 6 6 2},
{0 4 4 6 6 2},
{0 0 4 6 2 2},
{4 4 0 6 2 2},
{6 4 2 6 0 2},
{2 4 6 2 0 6},
{4 2 0 0 6 4},
{6 2 2 0 0 4},
{2 6 6 0 0 4},
{2 2 6 0 4 4},
{6 6 2 0 4 4},
{0 6 4 0 2 4},
{4 6 0 4 2 0},
{6 4 2 2 0 6},
{0 4 4 2 2 6},
{4 0 0 2 2 6},

{4 4 0 2 6 6},
{0 0 4 2 6 6}.

According to one embodiment, this application further provides a signal transmission method in wireless communication. This method includes:

determining a sequence $\{f_n\}$ that includes 2×N elements, where $f_n$ is an element of $\{f_n\}$ N is a positive integer and an even number, n is an integer, and 0≤n≤2×N−1, where N=6;

mapping the sequence $\{f_n\}$ to 2×N subcarriers; and sending, on the 2×N subcarriers, a signal that carries the sequence $\{f_n\}$;

where the sequence $\{f_n\}$ is as follows:

when n is an odd number, $f_n=A_1 \cdot x_n \cdot \exp(2\pi \cdot j \cdot \alpha \cdot n)$;

when n is an even number, $f_n=A_2 \cdot x_n \cdot \exp(2\pi \cdot j \cdot \alpha \cdot n)$; where $A_1$ and $A_2$ are non-zero complex numbers, α is a real number, j=, exp(j×h) represents $e^{j \times h}$, and h is any real number; and $\{x_n\}$ is a sequence that meets the following conditions: an element $x_n$ in $\{x_n\}$ meets:

$x_n = u \cdot \exp(\pi \cdot j \cdot s_n/4)$, where u is a non-zero complex number, $\{s_n\}$ is a sequence including $s_n$ and the sequence $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:

{3, 3, −3, −1, 3, −1, 3, −1, −3, 3, 3, 3},
{1, −1, 1, −3, −3, −1, 1, 3, 1, 1, −3, 3},
{−3, −1, 1, 1, 1, −1, −3, 3, 1, −3, 1, 3},
{−3, −1, 3, −1, −3, 3, −3, 3, 3, 3, −3, −1},
{3, 1, 3, 1, −1, −3, 3, −3, −3, −1, 3, −3},
{3, 1, −1, −3, −1, −3, 3, −3, 1, 3, 3, −3},
{1, 3, −1, 1, 1, 3, 1, −1, −3, 3, −3, 3},
{−1, 1, 1, 3, −1, 1, −1, −3, −1, −3, 3, 1},
{1, −3, −3, −1, −3, −3, −1, 3, −3, 3, −1, −1},
{−1, −3, −1, 3, 3, −3, −3, 3, −1, −1, −3, −1},
{3, 1, 3, 3, −1, 1, −1, −3, −3, 1, −1, 1},
{3, 3, −3, −1, 3, −1, 1, 1, 1, −1, −3, 1},
{−3, 3, 1, 3, −3, 3, −3, −1, 1, −1, −3, −1},
{−3, 1, 3, 3, 1, 3, −1, −3, 1, 1, −1, 3},
{−1, −3, 3, −3, −3, 3, −1, 1, −1, −3, −1, 1},
{1, 3, 1, −1-3, −1, −1, −3, −3, −1, 1, −1},
{1, −1, −1, −3, −3, −3, 1, −3, −3, −1, −1, 1},
{−1, 1, −1, −3, −1, 1, 1, −1, 3, −3, −1, −3},
{3, −1, −3, −3, 1, −1, 3, −3, 3, 3, −3, 1},
{−1, 1, −1, −3, 1, 3, −1, −3, −1, 1, 3, 1},
{3, −3, 1, 3, 1, 1, 1, −3, 3, 1, −3, 3},
{3, 3, −1, −1-1, 1, 1, −1, −1, 3, −1, 3},
{1, 3, 1, 3, −1, −1, 1, −3, 1, −1, −3, 3},
{1, −3, 3, 3, 3, 1, −3, −1, 1, 1, 3, −1}, and
{−3, 3, −3, −1, 1, −3, 1, 1, 1, 3, 1, −1};

an equivalent sequence of $\{s_n\}$ is $\{q_n\}$, where $q_n = s_n + u_n$ (mod 8), 0≤n≤11, and a sequence is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

In the embodiments, there are the following designs.

In an example, the mapping the sequence $\{f_n\}$ to 2×N subcarriers includes:

mapping $\{f_n\}$ to 2×N contiguous subcarriers; or mapping $\{f_n\}$ to 2×N noncontiguous and equally gapped subcarriers; or mapping $\{f_n\}$ to a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier; or mapping $\{f_n\}$ to a subcarrier group 1 and a subcarrier group 2, where the subcarrier group 1 and the subcarrier group 2 each include N noncontiguous and equally gapped subcarriers, and the subcarrier group 1 and the subcarrier group 2 are separated by at least one subcarrier.

In one embodiment, subcarrier group 1 and the subcarrier group 2 are separated by at least N−1 subcarriers.

In an example, $A_1$ and $A_2$ fall within a value range of {1, −1, j, −j}. When values of $A_1$ and $A_2$ fall within the foregoing value range, CM/PAPR of a transmitted signal is low.

In an example, $A_1$ and $A_2$ are modulated symbols; or $A_1$ is a modulated symbol and $A_2$ is a constant; or $A_2$ is a modulated symbol and $A_1$ is a constant.

According to one embodiment, this application provides a signal reception method in wireless communication. This method includes:

receiving a signal on 2×N subcarriers;

obtaining 2×N elements of a sequence $\{f'_n\}$, where $f'_n$ is an element of $\{f'\}$, N is a positive integer and an even number, n is an integer, and 0≤n≤2×N−1; and processing the signal on the 2×N subcarriers based on the 2×N elements of the sequence $\{f'_n\}$;

where $\{f'_n\}$ is as follows:

when n is an odd number, $f'_n = A_3 \cdot x_n \cdot \exp(2\pi \cdot j \cdot \alpha' \cdot n)$;

when n is an even number, $f'_n = A_4 \cdot x_n \cdot \exp(2\pi \cdot j \cdot \alpha' \cdot n)$;

where $A_3$ and $A_4$ are non-zero complex numbers, α' is a real number, $j=\sqrt{-1}$, exp(j×h) represents $e^{j \times h}$, and h is any real number; and $\{x_n\}$ meets at least one of the following conditions:

condition 1: when n is an even number greater than or equal to 0 and less than or equal to N−1, $x_{n+N} = \alpha \times j \times x_n;$ when n is an odd number greater than or equal to 0 and less than or equal to N−1, $x_{n+N} = -\alpha \times j \times x_n;$ where a=1 or 1, j=, and N is a positive integer and an even number; and condition 2: when N=6, $x_{2n+6} = a_n \cdot x_{2n}$, and $x_{2n+1+6} = b_n \cdot x_{2n+1}$, where $\begin{aligned} a_n &= c \cdot \exp(\pi \cdot j \cdot y_n/4) \\ b_n &= c \cdot \exp(\pi \cdot j \cdot y_{n+3}/4) \end{aligned}$, c is a non-zero complex number, $0 \le n \le 2$, and
{$y_0\ y_1\ y_2\ y_3\ y_4\ y_5$} is one of the following sequences:
{2 0 6 2 4 6},
{6 0 2 6 4 2},
{0 6 4 4 2 0},
{2 6 6 4 4 0},
{6 2 2 4 4 0},
{6 6 2 4 0 0},
{2 2 6 4 0 0},
{4 2 0 4 6 0},
{0 2 4 0 6 4},
{2 0 6 6 4 2},
{4 0 0 6 6 2},
{0 4 4 6 6 2},
{0 0 4 6 2 2},
{4 4 0 6 2 2},
{6 4 2 6 0 2},
{1 2 4 6 2 0 6},
{4 2 0 0 6 4},
{6 2 2 0 0 4},
{2 6 6 0 0 4},
{2 2 6 0 4 4},
{6 6 2 0 4 4},
{0 6 4 0 2 4},
{4 6 0 4 2 0},
{6 4 2 2 0 6},
{0 4 4 2 2 6},
{4 0 0 2 2 6},
{4 4 0 2 6 6},
{0 0 4 2 6 6}.

According to one embodiment, this application provides a signal reception method in wireless communication. This method includes:
receiving a signal on 2×N subcarriers;
obtaining 2×N elements of a sequence { }, where $f'_n$ is an element of {$f'_n$}, N is a positive integer and an even number, n is an integer, and $0 \le n \le 2 \times N - 1$; and processing the signal on the 2×N subcarriers based on the 2×N elements of the sequence {$f'_n$};
where {$f'_n$} is as follows:
when n is an odd number, $f'_n = A_3 \cdot x_n \cdot \exp(2\pi \cdot j \cdot \alpha' \cdot n)$;
when n is an even number, $f'_n = A_4 \cdot x_n \cdot \exp(2\pi \cdot j \cdot \alpha' \cdot n)$;
where
$A_3$ and $A_4$ are non-zero complex numbers, $\alpha'$ is a real number, $j = \sqrt{-1}$, $\exp(j \times h)$ represents $e^{j \times h}$, and h is any real number; and
{$x_n$} is a sequence that meets the following conditions: an element $x_n$ in {$x_n$} meets:
$x_n = u \cdot \exp(\pi \cdot j \cdot s_n/4)$, where u is a non-zero complex number, {$s_n$} is a sequence including $s_n$, and
the sequence {$s_n$}={$s_0, s_1, s_2, s_3, s_4, s_5, s_6, s_7, s_8, s_9, s_{10}, s_{11}$} is one of the following sequences or one of equivalent sequences of the following sequences:
{3, 3, −3, −1, 3, −1, 3, −1, 3, 3, 3, 3},
{1, −1, 1, −3, −3, −1, 1, 3, 1, 1, −3, 3},
{−3, −1, 1, 1, 1, −1, −3, 3, 1, −3, 1, 3},
{−3, −1, 3, −1, −3, 3, −3, 3, 3, 3, −3, −1},
{3, 1, 3, 1, −1, −3, 3, −3, −3, −1, 3, −3},
{3, 1, −1, −3, −1, −3, 3, −3, 1, 3, 3, −3},
{1, 3, −1, 1, 1, 3, 1, −1, −3, 3, −3, 3},
{−1, 1, 1, 3, −1, 1, −1, −3, −1, −3, 3, 1},
{1, −3, −3, −1, −3, −3, −1, 3, −3, 3, −1, −1},
{−1, −3, −1, 3, 3, −3, −3, 3, −1, −1, −3, −1},
{3, 1, 3, 3, −1, 1, −1, −3, −3, 1, −1, 1},
{3, 3, −3, −1, 3, −1, 1, 1, 1, −1, −3, 1},
{−3, 3, 1, 3, −3, 3, −3, −1, 1, −1, −3, −1},
{−3, 1, 3, 3, 1, 3, −1, −3, 1, 1, −1, 3},
{−1, −3, 3, −3, −3, 3, −1, 1, −1, −3, −1, 1},
{1, 3, 1, −1−3, −1, −1, −3, −3, −1, 1, −1},
{1, −1, −1, −3, −3, −3, 1, −3, −3, −1, −1, 1},
{−1, 1, −1, −3, −1, 1, 1, −1, 3, −3, −1, −3},
{3, −1, −3, −3, 1, −1, 3, −3, 3, 3, −3, 1},
{−1, 1, −1, −3, 1, 3, −1, −3, −1, 1, 3, 1},
{3, −3, 1, 3, 1, 1, 1, −3, 3, 1, −3, 3},
{3, 3, −1, −1−1, 1, 1, −1, −1, 3, −1, 3},
{1, 3, 1, 3, −1, −1, 1, −3, 1, −1, −3, 3},
{1, −3, 3, 3, 3, 1, −3, −1, 1, 1, 3, −1}, and
{−3, 3, −3, −1, 1, −3, 1, 1, 1, 3, 1, −1};

an equivalent sequence of {$s_n$} is {$q_n$}, where $q_n = s_n + u_n$ (mod 8), and $0 \le n \le 11$; and
a sequence is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

The foregoing sequence design and the manner of mapping data to subcarriers decrease a CM/PAPR value of a transmitted signal of an OFDM system, thereby improving link quality.

In the embodiments, there are the following designs.

When N=6, an element $x_n$ of {$x_n$}, where $0 \le n \le 11$, meets $x_n = g \cdot \exp(\pi \cdot j \cdot s_n/4)$, where g is a non-zero complex number, {$s_n$} is a sequence including $s_n$, and when $\{x_n\}$ meets the condition 1, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:

{1, 3, 3, 1, −3, −1, 3, 1, −3, −1, −1, −3};
{−3, 1, 3, 1, −3, −3, −1, −1, −3, −1, −1, 3};
{−1, 3, −1, 1, 3, 3, 1, 1, 1, −1, −3, 1};
{1, −1, −3, 1, −3, −1, 3, −3, −1, −1, −1, −3};
{3, 1, −3, −3, 3, −3, −3, −1, −1, 3, −3, 3};

when the sequence $\{x_n\}$ meets the condition 2, $\{s_n\}$ meets the following conditions:

when $\{Z_i\}$ is $\{2\ 0\ 6\ 2\ 4\ 6\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{1, 3, −3, 1, −3, 3, 3, −3, −3, −3, 3, 1},
{1, −3, 1, −1, −3, −3, 3, −1, 1, 3, 3, 3},
{3, −3, −3, 1, 3, 1, −1, 1, −1, −1, 3, 1},
{3, 1, 1, 1, 3, −3, −1, −3, 3, −1, 3, −3},
{3, 1, 3, 3, −1, 1, −1, −3, −3, 1, −1, 1},
{3, 1, 1, 1, 3, −3, −1, −3, 3, −1, 3, −3}; or when $\{Z_i\}$ is $\{6\ 0\ 2\ 6\ 4\ 2\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{1, −3, −3, −1, −3, −3, −1, 3, −3, 3, −1, −1},
{−1, −3, −1, 3, 3, −3, −3, 3, −1, −1, −3, −1},
{−1, 1, 3, 3, 3, 1, −1, 1, −3, 1, −1, −3},
{1, 3, 1, 1, −3, 3, 1, 3, 3, −1, 1, −1}; or when $\{Z_i\}$ is $\{0\ 6\ 4\ 4\ 2\ 0\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{1, 3, −1, 1, 1, 3, 1, −1, −3, 3, −3, 3},
{−1, 1, 1, 3, −1, 1, −1, −3, −1, −3, 3, 1},
{−1, 3, 3, −1, 3, −1, 1, 1, 3, 3, 1, 1},
{−3, 3, −3, 3, 1, −1, −1, 1, −3, −1, −1, 1}; or when $\{Z_i\}$ is $\{2\ 6\ 6\ 4\ 4\ 0\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{3, −3, −3, −3, 1, 3, −3, 1, 3, 1, −1, 3},
{−3, −3, −1, −3, 3, 3, 1, 3, −1, 3, 3, −3}; or when $\{Z_i\}$ is $\{6\ 2\ 2\ 4\ 4\ 0\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{−3, 1, 3, 1, −1, 3, 3, −3, −3, −3, 1, 3},
{3, 1, −3, −3, −3, 3, 3, −1, 1, 3, 1, −3}; or when $\{Z_i\}$ is $\{6\ 6\ 2\ 4\ 0\ 0\}$, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:

{−3, −3, 3, −3, −1, −1, 3, 1, 1, −3, 1, −1},
{−3, 3, 3, 3, −1, −3, −3, 1, 3, −3, 3, −1}; or when $\{Z_i\}$ is $\{2\ 2\ 6\ 4\ 0\ 0\}$, $\{s_n\}=\{s_0, s_1, s_2, s_3, s_4, s_5, s_6, s_7, s_8, s_9, s_{10}, s_{11}\}$ is one of
the following sequences or one of equivalent sequences of the following sequences:

{−1, 3, 1, 3, −3, 1, 1, −1, 3, 3, 3, 1},
{−3, 3, 3, −1, 3, 1, 1, 1, −1, 1, 3, 3};

where an equivalent sequence of $\{s_n\}$ other than $\{s_n\}$ itself is $\{q_n\}$, where $q_n = s_n + u_n$ (mod 8), $0 \le n \le 11$, and
a sequence is one of the following sequences:

{0, 0, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

In the embodiments, there are the following designs.

In an example, the receiving a signal on 2×N subcarriers includes:

obtaining, on 2×N contiguous subcarriers, the signal on the 2×N subcarriers; or obtaining, on 2×N noncontiguous and equally gapped subcarriers, the signal on the 2×N subcarriers; where in a way of mapping $\{f_n\}$ to contiguous or equally gapped subcarriers, a CM value is relatively satisfactory; or obtaining the signal on the 2×N subcarriers of a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier; or obtaining the signal on the 2×N subcarriers of a subcarrier group 1 and a subcarrier group 2, where the subcarrier group 1 and the subcarrier group 2 each include N noncontiguous and equally gapped subcarriers, and the subcarrier group 1 and the subcarrier group 2 are separated by at least one subcarrier.

In one embodiment, subcarrier group 1 and the subcarrier group 2 are separated by at least N−1 subcarriers. If the subcarrier group 1 and the subcarrier group 2 are separated by at least N−1 subcarriers, a lower PAPR/CM can be obtained. In addition, better frequency diversity effect is obtained.

In an example, $A_3$ and $A_4$ fall within a value range of $\{1, -1, j, -j\}$.

In the foregoing embodiments, there are the following designs.

In an example, the sequence $\{x_n\}$ is selected from a sequence set J. Because a plurality of cells coexist in a communications system, neighboring cells need to use different sequences to transmit data. Therefore, the sequence set J is required, so that neighboring cells can use different sequences in the sequence set J to reduce interference between the cells.

It may be understood that the method described in any of the foregoing embodiments may be implemented through a communications apparatus. The apparatus may be a communications device, or may be a chip. The communications device may be a terminal device, or may be a network device.

According to one embodiment, this application provides a communications apparatus. The apparatus may be a communications device, or may be a chip. The communications device may be a terminal, or may be a base station. The communications apparatus may implement the method described in any of the foregoing embodiments, and has corresponding function units. The function units may be implemented by hardware, may be implemented by software, or may be implemented by hardware by executing corresponding software. The hardware or software includes one or more modules corresponding to the foregoing functions.

The communications apparatus includes: a processing unit and a storage unit. The storage unit stores an instruction, where the instruction is used to enable the processing unit to perform the method described in any of the foregoing embodiments. The processing unit may be implemented by one or more processors. The storage unit may be a memory or any other storage module that possesses a storage function. The storage unit may be disposed separately from the processor, or may be integrated with the processor.

The communications apparatus may further include: a transceiver unit, where the transceiver unit includes a sending unit and a receiving unit. The sending unit is configured to send information to a receive device when the communications apparatus serves as a transmit device. The receiving unit is configured to receive information from a transmit device when the communications apparatus serves as a receive device. For example, the transceiver unit may be implemented by a transceiver.

For example, the sending unit may be configured to send, on 2×N subcarriers, a signal that carries a sequence $\{f_n\}$.

For another example, the receiving unit may be configured to receive a signal. The processing unit is configured to obtain the signal on the 2×N subcarriers based on the received signal.

According to one embodiment, this application provide a computer storage medium, configured to store a computer software instruction used by the foregoing communications apparatus, where the computer software instruction includes a program designed for executing the foregoing embodiments.

According to one embodiment, this application provides a computer program product, where the computer program product includes an instruction, and when the computer program is executed by a computer, the instruction enables the computer to perform the method described in the foregoing embodiments.

According to one embodiment a system is provided, where the system includes the foregoing communications apparatus.

According to one embodiment, this application provides a chip system, where the chip system includes a processor, configured to support the foregoing communications apparatus in implementing functions in the foregoing embodiments, for example, generating or processing data and/or information in the foregoing methods. In one embodiment, the chip system may further include a memory, where the memory is configured to store a program instruction and data for the data sending device. The chip system may consist of chips, or may include a chip and other discrete devices.

Compared with the prior art, this application describes a signal transmission method, signal reception method, apparatus, and system, to decrease a CM/PAPR value of a transmitted signal of an OFDM system through sequence design and mapping of data to subcarriers, thereby improving link quality of an entire transmission system.

DESCRIPTION OF DRAWINGS

The following describes in more details the embodiments of this application with reference to accompanying drawings.

DESCRIPTION OF EMBODIMENTS

The following clearly and completely describes the technical solutions in the embodiments of this application with reference to the accompanying drawings in the embodiments of this application.

Figure 1:
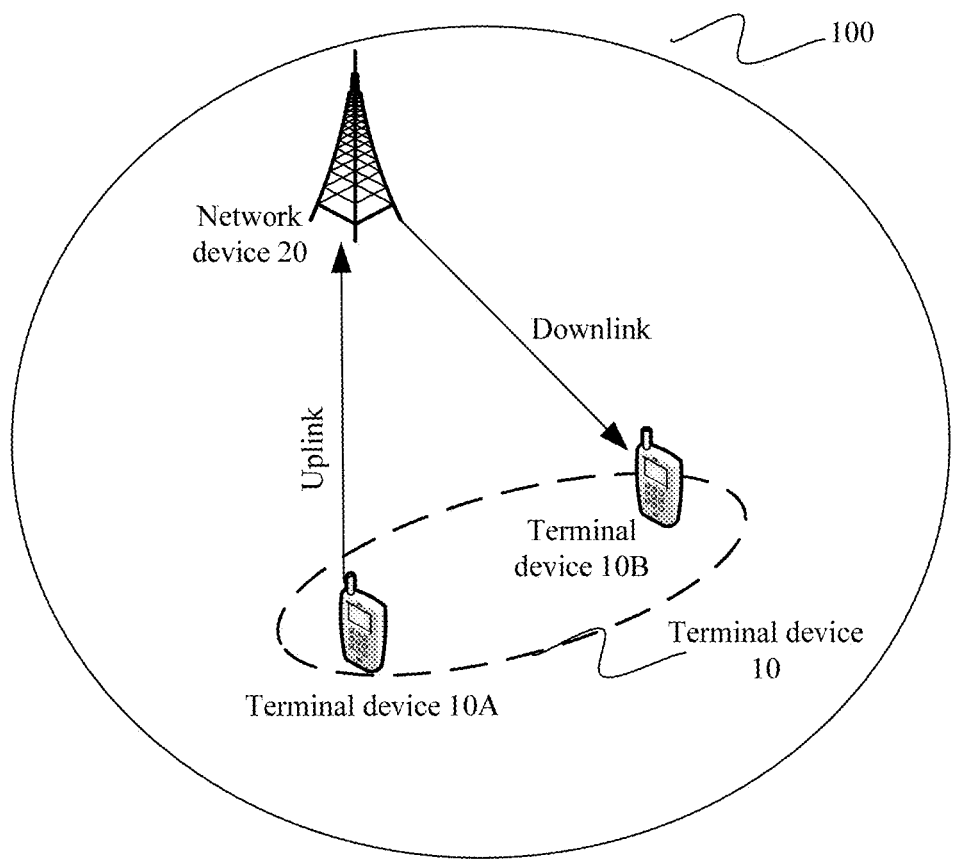
FIG. 1 is a schematic diagram of a possible application scenario according to this application.

A technology described in this application is applicable to an LTE system and a subsequent evolved system such as 5G, or other wireless communications systems that employ an OFDM access technology, especially applicable to a communications system for which a CM value of a transmitted signal needs to be decreased. FIG. 1 is a schematic diagram of a possible application scenario according to this application. For example, a communications system 100 shown in FIG. 1 includes at least one network device 20 (for example, including a base station) and a plurality of terminal devices 10 (10A and 10B). The plurality of terminal devices 10 communicate with the network device 20. In a downlink direction, the network device 20 communicates with the terminal device 10 over a downlink channel. In an uplink direction, the terminal device 10 communicates with the network device 20 over an uplink channel. Downlink is a direction in which the network device 20 sends data to the terminal device 10, whereas uplink is a direction in which the terminal device 10 sends data to the network device 20.

It should be understood that, a technical solution in the embodiments of the disclosure may be applied to communications systems with various access standards, for example, an LTE) system, an LTE frequency division duplex (FDD) system, an LTE time division duplex (TDD) communications system, a 5G LTE system, a 5G new radio (NR) system and its subsequent evolved systems, or a system that integrates a plurality of access standards.

It should also be understood that in the embodiments of the disclosure, the terminal device or terminal equipment may be referred to as a terminal, user equipment (UE), a mobile station (MS), a mobile terminal, a laptop computer, and the like. The terminal device may communicate with one or more core networks by using a radio access network (RAN). For example, the terminal device may be a mobile phone (also referred to as a "cellular" phone) or a computer with a mobile terminal. For example, the terminal device may also be a portable, pocket-sized, handheld, computer built-in, or in-vehicle mobile apparatus, which exchanges voice and/or data with the radio access network.

In one embodiment, the network device may be an evolved NodeB (eNB or e-NodeB for short) in an LTE system, a base station in a 5G LTE system, or a base station in a 5G NR system; may be another base station; or may be a network device such as a relay node. This is not limited in the embodiments of the disclosure.

The technical solution provided in this application may be applied to uplink data transmission and/or downlink data transmission. For uplink data transmission, a data sending device may be a terminal device, and a data receiving device may be a network side device, such as a base station; for downlink data transmission, a data sending device may be a network side device, such as a base station, and a data receiving device may be a terminal device.

The following explains general concepts or definitions in the embodiments of this application. It should be noted that, some English abbreviations in this specification are descriptions about the embodiments of this application by using an LTE system as an example, and may change with network evolution. For specific evolution, refer to the description in a corresponding standard.

Fast Fourier transform (FFT) described in this application is a fast algorithm for performing discrete Fourier transform (DFT). The FFT described in this application may also be replaced with another algorithm that can perform Fourier Transform, which is not limited in this application. Inverse fast Fourier transform (IFFT) is a fast algorithm for performing inverse discrete Fourier transform (IDFT). The IFFT described in this application may also be replaced with another algorithm that can perform inverse Fourier transform, which is not limited in this application.

The "data" described in this application normally means service data, but may also include content such as signaling and a message that needs to be transmitted by a system, for example, a reference signal and an uplink-downlink control message.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In this application, TX represents T×X, where T and X may be any number. For example, 2X represents 2×X.

"C mod K" in this application represents a modulo operation of C by K, where a value range is 0 to K−1, K is a positive integer, and C is a real number. For example, "10 mod 8" evaluates to 2. Using "(mod K)" to the right of an equation means that both sides of the equation are equal in the sense of mod K, that is, mod K operation needs to be performed on both sides of the equation. For example, a=b (mod K) indicates that a mod K=b mod K.

In this application, equivalent sequences of a sequence $\{p_i\}$ are the sequence itself and the following sequences, where $0 \le i \le 2 \times N-1$, and N is a positive integer:

$\{q_0, q_1, q_2, \ldots, q_{2N-1}\}$ meets $q_i = p_i + u_i \pmod 8$, where $u_i = v_i$, or is a sequence obtained by adding up a plurality of $v_i$ that can be selected repeatedly;

$v_i = (i \bmod 2) \cdot 4$, $i=0, 1, 2, \ldots, 2N-1$ or $v_i = (i \bmod 2) \cdot 2$, $i=0, 1, 2, \ldots, 2N-1$ or $v_i = -(i \bmod 2) \cdot 2$, $i=0, 1, 2, \ldots, 2N-1$ or $v_i = (i \bmod 4) \cdot 2$, $i=0, 1, 2, \ldots, 2N-1$ or $v_i = -(i \bmod 4) \cdot 2$, $i=0, 1, 2, \ldots, 2N-1$ or $v_i = 2$, $i=0, 1, 2, \ldots, 2N-1$, or $v_i = 4$, $i=0, 1, 2, \ldots, 2N-1$, or $v_i = 6$, $i=0, 1, 2, \ldots, 2N-1$.

In this application, j indicates an imaginary part of a complex number. That is, $j^2 = -1$ or $j = \sqrt{-1}$.

The following gives more details about the technical solution in the embodiments of this application with reference to the accompanying drawings.

In this application, a transmit end is a device that sends a sequence. In one embodiment, the transmit end is a device that sends UCI. The UCI may be an acknowledgement/negative acknowledgement (ACK/NACK). In one embodiment, the UCI may alternatively be channel state information (CSI). The CSI may include one or more of the following information: channel quality indicator (CQI), precoding matrix indicator (PMI), and rank indication (RI).

Figure 2:
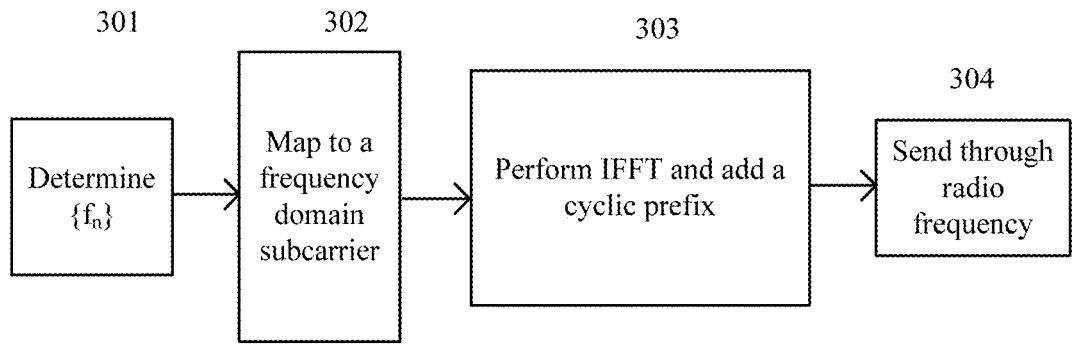
FIG. 2 is a schematic flowchart of data sending according to an embodiment of this application.

FIG. 2 is a schematic diagram of a transmit device of a data processing method according to an embodiment of this application.

In part 301, the transmit device determines a sequence $\{f_n\}$.

The transmit device determines the sequence $\{f_n\}$ that includes 2×N elements, where $f_n$ is an element of $\{f_n\}$, N is a positive integer and an even number, n is an integer, and $0 \le n \le 2 \times N-1$.

The sequence $\{f_n\}$ is as follows:

when n is an odd number, $f_n = A_1 \cdot x_n \cdot \exp(2\pi \cdot j \cdot \alpha \cdot n)$;

when n is an even number, $f_n = A_2 \cdot x_n \cdot \exp(2\pi \cdot j \cdot \alpha \cdot n)$, where $A_1$ and $A_2$ are non-zero complex numbers, a is a real number, $j = \sqrt{-1}$, exp(j×h) represents $e^{j \times h}$, and h is any real number.

In one embodiment, α is k/(2×N), where $0 \le k \le 2 \times N-1$. Multiplying $x_n$ by $\exp(2 \cdot \pi \cdot j \cdot \alpha \cdot n)$ is equivalent to phase weighting on $x_n$. A purpose of phase weighting on each element of a sequence $\{x_n\}$ is to cyclically shift a signal sequence obtained after $\{x_n\}$ goes through IFFT. In this way, transmit devices can be distinguished based on different cyclic shifts of the sequence, thereby multiplexing a plurality of transmit devices.

Figure 3A:
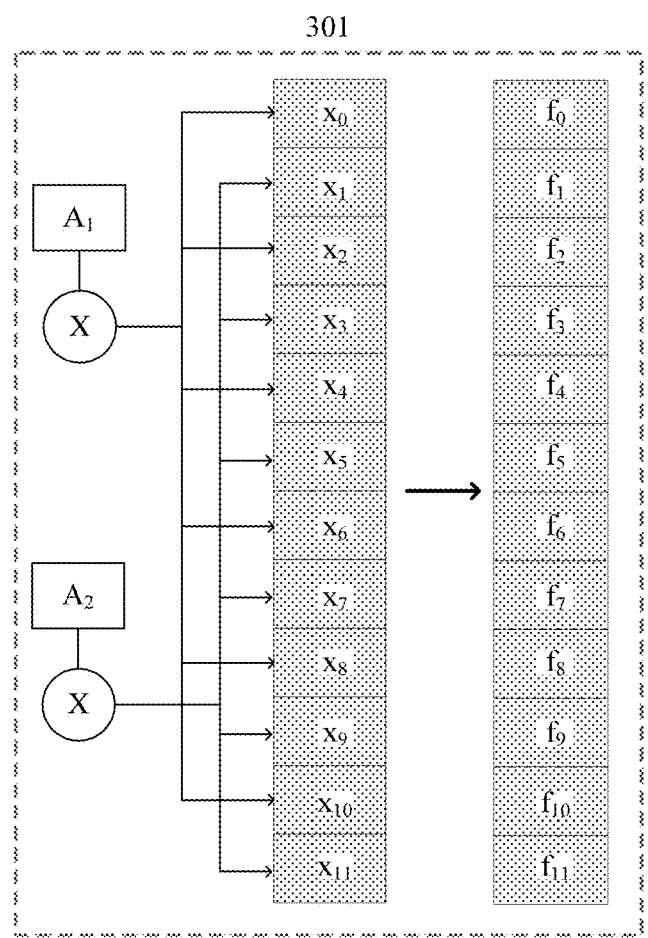
FIG. 3a is a schematic diagram of generating a sequence $\{f_n\}$ according to an embodiment of this application.

FIG. 3a provides an example of generating $\{f_n\}$ in part 301. The transmit device determines $\{x_n\}$, $A_1$, and $A_2 \cdot \{x_n\}$ may be stored by the transmit device, or may be calculated by the transmit device according to a predefined formula. In FIG. 3a, $0 \le n \le 11$ and $\alpha = 0$. $A_1$ is multiplied by each of $x_0$, $x_2$, $x_4$, $x_6$, $x_8$, and $x_{10}$, and $A_2$ is multiplied by each of $x_1$, $x_3$, $x_5$, $x_7$, $x_9$, and $x_{11}$, to obtain $\{f_n\} = \{A_1 x_0, A_2 x_1, A_1 x_2, A_2 x_3, A_1 x_4, A_2 x_5, A_1 x_6, A_2 x_7, A_1 x_8, A_2 x_9, A_1 x_{10}, A_2 x_{11}\}$. It may be considered that, an even element of $\{x_n\}$ carries a modulated symbol A, and an odd element of $\{x_n\}$ is a reference signal. $A_1$ and $A_2$ fall in a value range of $\{1, -1, j, -j\}$. In one embodiment, $A_1$ and $A_2$ may fall in a value range of $\{(1+j)/r, (1-j)/r, (-1+j)/r, (-1-j)/r\}$, where r is the square root of 2. Compared with $A_1$ and $A_2$ falling in the value range of $\{(1+j)/r, (1-j)/r, (-1+j)/r, (-1-j)/r\}$, a sent signal has a lower CM/PAPR value when $A_1$ and $A_2$ fall in the value range of $\{1, -1, j, -j\}$.

For $A_1$ and $A_2$ the following designs are also provided:

$A_1$ and $A_2$ are modulated symbols.

In this case, $A_1$ is obtained after a channel of data information bits or control information bits is modulated. $A_1$ is carried on an even element (where an even element may also be referred to as an even-numbered element) of $\{f_n\}$ At the same time, $A_2$ is obtained after the other channel of data information bits or control information bits is modulated. $A_2$ is carried on an odd element (where an odd element may also be referred to as an odd-numbered element) of $\{x_n\}$. For example, one channel of data is a 2-bit ACK/NACK and the other channel of data is a 2-bit CQI.

$A_1$ is a modulated symbol and $A_2$ is a constant.

For example, $A_1$ is obtained after data information bits or control information bits are modulated. $A_1$ is carried on an even element of $\{f_n\}$. An odd element of $\{f_n\}$ or $\{x_n\}$ is a reference signal. $A_2$ is a constant. For example, $A_2=1$. $A_2$ being a constant means that $A_2$ carries no information bits. For example, $A_2$ may be a symbol known to both a transmit end and a receive end. $A_2$ may alternatively represent an amplitude. $A_2$ being a constant does not mean that $A_2$ is fixed and invariable. At different sending moments, $A_2$ is different. For example, the transmit device is a terminal device, the odd element of $\{f_n\}$ or $\{x_n\}$ is a reference signal, and $A_2$ is an amplitude of the reference signal. In this case, the terminal device sends UCI based on $A_2=1$ when sending the UCI for the first time. The terminal device sends the UCI based on $A_2=2$ when sending the UCI for the second time.

Also, $A_2$ is a modulated symbol and $A_1$ is a constant. This case is similar to a case in which $A_1$ is a modulated symbol and $A_2$ is a constant. Details are not described again.

There may be a plurality of ways of mapping control information bits to $\{1, j, -1, j\}$. For example, a state of 2-bit information is mapped to a value in $\{1, j, -1, -j\}$. For example, (0,0) is mapped to 1, (1,0) is mapped to $-1$, (0,1) is mapped to j, (1,0) is mapped to $-j$, and (1,1) is mapped to 1.

In an example, $\{x_n\}$ is a sequence including $x_n$, and meets at least one of the following conditions:

condition 1: when n is an even number greater than or equal to 0 and less than or equal to N–1, $x_{n+N} = \alpha \times j \times x_n;$ when n is an odd number greater than or equal to 0 and less than or equal to N–1, $x_{n+N} = \alpha \times j \times x_n;$ where a=1 or 1, $j=\sqrt{-1}$, and N is a positive integer and an even number; and condition 2: when N=6, $x_{2n+6} = a_n \cdot x_{2n}$, and $x_{2n+1+6} = b_n \cdot x_{2n+1}$, where $\begin{array}{l} a_n = c \cdot \exp(\pi \cdot j \cdot y_n / 4) \\ b_n = c \cdot \exp(\pi \cdot j \cdot y_{n+3} / 4) \end{array}$, c is a non-zero complex number, $0 \leq n \leq 2$, and a value of $\{y_0\ y_1\ y_2 y_3\ y_4\ y_5\}$ is a sequence $\{E_i\}$, $\{B_i\}$, $\{C_i\}$, or $\{D_i\}$, where $0 \leq i \leq 5$, i is an integer, $B_i = Z_i + 2 \pmod 8$, $C_i = Z_i + 4 \pmod 8$, $D_i = Z_i + 6 \pmod 8$, $E_i = Z_i \pmod 8$, mod represents an modulo operation, and $\{Z_i\}$ is one of the following sequences:

{2 0 6 2 4 6},
{6 0 2 6 4 2},
{0 6 4 4 2 0},
{2 6 6 4 4 0},
{6 2 2 4 4 0},
{6 6 2 4 0 0},
{2 2 6 4 0 0}.

Table 1 lists an example of $\{E_i\}$, $\{B_i\}$, $\{C_i\}$, or $\{D_i\}$ obtained according to the foregoing formula. In one embodiment, the value of $\{y_0\ y_1\ y_2\ y_3\ y_4\ y_5\}$ is one of 28 sequences listed in Table 1.

TABLE 1

| $\{E_i\}$ | $\{B_i\}$ | $\{C_i\}$ | $\{D_i\}$ |
|---|---|---|---|
| {2 0 6 2 4 6} | {4 2 0 4 6 0} | {6 4 2 6 0 2} | {0 6 4 0 2 4} |
| {6 0 2 6 4 2} | {0 2 4 0 6 4} | {2 4 6 2 0 6} | {4 6 0 4 2 0} |
| {0 6 4 4 2 0} | {2 0 6 6 4 2} | {4 2 0 0 6 4} | {6 4 2 2 0 6} |
| {2 6 6 4 4 0} | {4 0 0 6 6 2} | {6 2 2 0 0 4} | {0 4 4 2 2 6} |
| {6 2 2 4 4 0} | {0 4 4 6 6 2} | {2 6 6 0 0 4} | {4 0 0 2 2 6} |
| {6 6 2 4 0 0} | {0 0 4 6 2 2} | {2 2 6 0 4 4} | {4 4 0 2 6 6} |
| {2 2 6 4 0 0} | {4 4 0 6 2 2} | {6 6 2 0 4 4} | {0 0 4 2 6 6} |

In another example, N=6, and $\{x_n\}$ is one of sequences that meet the following conditions. The element $x_n$ in $\{x_n\}$ meets a condition 3.

$x_n = u \cdot \exp(\pi \cdot j \cdot s_n / 4)$, where $0 \leq n \leq 2 \times N - 1 \cdot \{s_n\}$ is a sequence including $s_n$.    Condition 3:

The sequence $\{s_n\} = \{s_0, s_1, s_2, s_3, s_4, s_5, s_6, s_7, s_8, s_9, s_{10}, s_{11}\}$ is one of the following sequences or one of equivalent sequences of the following sequences:

{3, 3, −3, −1, 3, −1, 3, −1, −3, 3, 3, 3},
{1, −1, 1, −3, −3, −1, 1, 3, 1, 1, −3, 3},
{−3, −1, 1, 1, 1, −1, −3, 3, 1, −3, 1, 3},
{−3, −1, 3, −1, −3, 3, −3, 3, 3, 3, −3, −1},
{−3, 3, −3, 3, 1, −1, −3, −1, −1, 1, −3, −1},
{3, 1, −1, −3, −1, −3, 3, −3, 1, 3, 3, −3},
{1, 3, −1, 1, 1, 3, 1, −1, −3, 3, −3, 3},
{−1, 1, 1, 3, −1, 1, −1, −3, −1, −3, 3, 1},
{1, −3, −3, −1, −3, −1, 3, −3, 3, −1, −1},
{−1, −3, −1, 3, 3, −3, −3, 3, −1, −1, −3, −1},
{3, 1, 1, 3, −3, −3, 3, 1, −3, 1, 3},
{3, 1, 3, 3, −1, 1, −1, −3, −3, 1, −1, 1},
{−3, 3, 1, 3, −3, 3, −3, −1, 1, −1, −3, −1},
{−3, 1, 3, 3, 1, 3, −1, −3, 1, 1, −1, 3},
{−1, −3, 3, −3, −3, 3, −1, 1, −1, −3, −1, 1},
{1, 3, 1, −1, −3, −1, −1, −3, −3, −1, 1, −1},
{1, −1, −1, −3, −3, 3, 1, −3, −3, −1, −1, 1},
{−1, 1, −1, −3, −1, 1, 1, −1, 3, −3, −1, −3},
{3, −1, −3, −3, 1, −1, 3, −3, 3, 3, −3, 1},
{−1, 1, −1, −3, 1, 3, −1, −3, −1, 1, 3, 1},
{3, −3, 1, 3, 1, 1, 1, −3, 3, 1, −3, 3},
{3, 3, −1, −1, −1, 1, 1, −1, −1, 3, −1, 3},
{1, 3, 1, 3, −1, −1, 1, −3, 1, −1, −3, 3},
{1, −3, 3, 3, 3, 1, −3, −1, 1, 1, 3, −1},
{−3, 3, −3, −1, 1, −3, 1, 1, 1, 3, 1, −1},
{1, −3, −3, 3, −1, 3, 3, −3, −1, −1, −3, −1},
{−1, 3, −3, 1, −3, −3, −3, −1, −1, 1, −1, −3},
{−3, 3, 1, 1, 3, 1, 3, 3, −1, 1, −1, 3},
{1, 3, −1, −1, 1, −1, −1, 3, 3, 1, −3, 1},

{−1, −3, 3, −3, −3, −1, −1, −1, 3, −1, 1, −3}, and
{−1, 3, 3, −3, 1, −3, −1, −3, 3, 3, −3, 3}.
The foregoing sequence set is defined as P31.

Alternatively, the sequence $\{s_n\}=\{s_0, s_1, s_2, s_3, s_4, s_5, s_6, s_7, s_8, s_9, s_{10}, s_{11}\}$ is one of sequences in a set P33 or one of equivalent sequences of the sequences in the set P33; or one of sequences in a set P25 or one of equivalent sequences of the sequences in the set P25; or one of sequences in a set P30 or one of equivalent sequences of the sequences in the set P30.

The set P33 is a set of the following sequences:
{3, 3, −3, −1, 3, −1, 3, −1, −3, 3, 3, 3}
{1, −1, 1, −3, −3, −1, 1, 3, 1, 1, −3, 3};
{−3, −1, 1, 1, 1, −1, −3, 3, 1, −3, 1, 3};
{−3, −1, 3, −1, −3, 3, −3, 3, 3, 3, −3, −1};
{3, 1, 3, 1, −1, −3, 3, −3, −3, −1, 3, −3};
{3, 1, −1, −3, −1, −3, 3, −3, 1, 3, 3, −3};
{1, 3, −1, 1, 1, 3, 1, −1, −3, 3, −3, 3};
{−1, 1, 1, 3, −1, 1, −1, −3, −1, −3, 3, 1};
{1, −3, −3, −1, −3, −3, −1, 3, −3, 3, −1, −1};
{−1, −3, −1, 3, 3, −3, −3, 3, −1, −1, −3, −1};
{3, 1, 3, 3, −1, 1, −1, −3, −3, 1, −1, 1};
{3, 3, −3, −1, 3, −1, 1, 1, 1, −1, −3, 1};
{−3, 3, 1, 3, −3, 3, −3, −1, 1, −1, −3, −1};
{−3, 1, 3, 3, 1, 3, −1, −3, 1, 1, −1, 3};
{−1, −3, 3, −3, −3, 3, −1, 1, −1, −3, −1, 1};
{1, 3, 1, −1, −3, −1, −1, −3, −3, −1, 1, −1};
{1, −1, −1, −3, −3, −3, 1, −3, −3, −1, −1, 1};
{−1, 1, −1, −3, −1, 1, 1, −1, 3, −3, −1, −3};
{3, −1, −3, −3, 1, −1, 3, −3, 3, 3, −3, 1};
{−1, 1, −1, −3, 1, 3, −1, −3, −1, 1, 3, 1};
{3, −3, 1, 3, 1, 1, 1, −3, 3, 1, −3, 3};
{3, 3, −1, −1, −1, 1, 1, −1, −1, 3, −1, 3};
{1, 3, 1, 3, −1, −1, 1, −3, 1, −1, −3, 3};
{1, −3, 3, 3, 3, 1, −3, −1, 1, 1, 3, −1};
{−3, 3, −3, −1, 1, −3, 1, 1, 1, 3, 1, −1};
{−3, −1, −1, 1, −1, −3, 3, 3, −1, 3, −3, 1};
{−3, 1, −3, −3, −1, −1, −1, 1, −1, −3, −3, 3};
{1, 3, −1, −1, −1, 1, −1, 3, −3, 3, 1, −3};
{−1, 1, −3, −1, 1, −1, 3, −1, −3, 1, 1, 1};
{−1, 3, −3, 1, −3, −3, −3, −1, −1, 1, −1, −3};
{−3, 3, −3, −1, 3, −3, 1, 1, 1, −3, 3, −1};
{3, −3, −3, −1, −1, 3, −1, 3, 3, 1, 1};
{3, −3, −3, 1, −3, −1, −1, −1, 1, −1, −3, −3}.

The set P25 is a set of the following sequences:
{3, 3, −3, −1, 3, −1, 3, −1, −3, 3, 3, 3}
{1, −1, 1, −3, −3, −1, 1, 3, 1, 1, −3, 3};
{−3, −1, 1, 1, 1, −1, −3, 3, 1, −3, 1, 3};
{−3, −1, 3, −1, −3, 3, −3, 3, 3, 3, −3, −1};
{3, 1, 3, 1, −1, −3, 3, −3, −3, −1, 3, −3};
{3, 1, −1, −3, −1, −3, 3, −3, 1, 3, 3, −3};
{1, 3, −1, 1, 1, 3, 1, −1, −3, 3, −3, 3};
{−1, 1, 1, 3, −1, 1, −1, −3, −1, −3, 3, 1};
{1, −3, −3, −1, −3, −3, −1, 3, −3, 3, −1, −1};
{−1, −3, −1, 3, 3, −3, −3, 3, −1, −1, −3, −1};
{3, 1, 3, 3, −1, 1, −1, −3, −3, 1, −1, 1};
{3, 3, −3, −1, 3, −1, 1, 1, 1, −1, −3, 1};
{−3, 3, 1, 3, −3, 3, −3, −1, 1, −1, −3, −1};
{−3, 1, 3, 3, 1, 3, −1, −3, 1, 1, −1, 3};
{−1, −3, 3, −3, −3, 3, −1, 1, −1, −3, −1, 1};
{1, 3, 1, −1, −3, −1, −1, −3, −3, −1, 1, −1};
{1, −1, −1, −3, −3, −3, 1, −3, −3, −1, −1, 1};
{−1, 1, −1, −3, −1, 1, 1, −1, 3, −3, −1, −3};
{3, −1, −3, −3, 1, −1, 3, −3, 3, 3, −3, 1};
{−1, 1, −1, −3, 1, 3, −1, −3, −1, 1, 3, 1};
{3, −3, 1, 3, 1, 1, 1, −3, 3, 1, −3, 3};
{3, 3, −1, −1, −1, 1, 1, −1, −1, 3, −1, 3};
{1, 3, 1, 3, −1, −1, 1, −3, 1, −1, −3, 3};
{1, −3, 3, 3, 3, 1, −3, −1, 1, 1, 3, −1};
{−3, 3, −3, −1, 1, −3, 1, 1, 1, 3, 1, −1};

The set P30 is a set of the following sequences:
{3, 3, −3, −1, 3, −1, 3, −1, −3, 3, 3, 3}
{1, −1, 1, −3, −3, −1, 1, 3, 1, 1, −3, 3};
{−3, −1, 1, 1, 1, −1, −3, 3, 1, −3, 1, 3};
{−3, −1, 3, −1, −3, 3, −3, 3, 3, 3, −3, −1};
{3, 1, 3, 1, −1, −3, 3, −3, −3, −1, 3, −3};
{3, 1, −1, −3, −1, −3, 3, −3, 1, 3, 3, −3};
{1, 3, −1, 1, 1, 3, 1, −1, −3, 3, −3, 3};
{−1, 1, 1, 3, −1, 1, −1, −3, −1, −3, 3, 1};
{1, −3, −3, −1, −3, −3, −1, 3, −3, 3, −1, −1};
{−1, −3, −1, 3, 3, −3, −3, 3, −1, −1, −3, −1};
{3, 1, 3, 3, −1, 1, −1, −3, −3, 1, −1, 1};
{3, 3, −3, −1, 3, −1, 1, 1, 1, −1, −3, 1};
{−3, 3, 1, 3, −3, 3, −3, −1, 1, −1, −3, −1};
{−3, 1, 3, 3, 1, 3, −1, −3, 1, 1, −1, 3};
{−1, −3, 3, −3, −3, 3, −1, 1, −1, −3, −1, 1};
{1, 3, 1, −1, −3, −1, −1, −3, −3, −1, 1, −1};
{1, −1, −1, −3, −3, −3, 1, −3, −3, −1, −1, 1};
{−1, 1, −1, −3, −1, 1, 1, −1, 3, −3, −1, −3};
{3, −1, −3, −3, 1, −1, 3, −3, 3, 3, −3, 1};
{−1, 1, −1, −3, 1, 3, −1, −3, −1, 1, 3, 1};
{3, −3, 1, 3, 1, 1, 1, −3, 3, 1, −3, 3};
{3, 3, −1, −1, −1, 1, 1, −1, −1, 3, −1, 3};
{1, 3, 1, 3, −1, −1, 1, −3, 1, −1, −3, 3};
{1, −3, 3, 3, 3, 1, −3, −1, 1, 1, 3, −1};
{−3, 3, −3, −1, 1, −3, 1, 1, 1, 3, 1, −1};
{−1, 1, −3, −1, 1, −1, −1, −3, 1, −3, 3, −1};
{−1, −1, −3, −3, −3, 1, 3, −1, 3, 1, −3, 3};
{3, −1, −3, 3, −1, −1, −3, −3, −3, 1, 3, 1};
{3, 3, −3, −1, −1, −1, −3, −1, −3, −1, −3, −3};
{1, 3, 3, 1, −1, 1, −3, −1, 1, 1, −1, 3}.

P33, P25, and P30 all include 25 common sequences. Other sequences of P33 lower sequence cross-correlation to obtain more sequences, and therefore the sequences of P33 have a relatively low CM/PAPR feature. P30 lowers CM/PAPR of the sequences to obtain more sequences, and therefore the sequences of P30 have relatively low cross-correlation.

In an example, N=6, and the element $x_n$ of $\{x_n\}$, where $0 \le n \le 11$, meets $x_n = g \cdot \exp(\pi \cdot j \cdot s_n/4)$, where g is a non-zero complex number, $\{s_n\}$ is a sequence including $s_n$, and when $\{x_n\}$ meets the condition 1, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{1, 3, 3, 1, −3, −1, 3, 1, −3, −1, −1, −3};
{−3, 1, 3, 1, −3, −3, −1, −1, −3, −1, −1, 3};
{−1, 3, −1, 1, 3, 3, 1, 1, 1, −1, −3, 1};
{1, −1, −3, 1, −3, −1, 3, −3, −1, −1, −1, −3};
{3, 1, −3, −3, 3, −3, −3, −1, −1, 3, −3, 3}.

When the sequence $\{x_n\}$ meets the condition 2 and $\{Z_i\}$ is {2 0 6 2 4 6}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{1, 3, −3, 1, −3, 3, 3, −3, −3, −3, 3, 1},
{1, −3, 1, −1, −3, −3, 3, −1, 1, 3, 3, 3},
{3, −3, −3, 1, 3, 1, −1, 1, −1, −1, 3, 1},
{3, 1, 1, 1, 3, −3, −1, −3, 3, −1, 3, −3},
{3, 1, 3, 3, −1, 1, −1, −3, −3, 1, −1, 1},
{3, 1, 1, 1, 3, −3, −1, −3, 3, −1, 3, −3}.

When the sequence $\{x_n\}$ meets the condition 2 and $\{Z_i\}$ is {6 0 2 6 4 2}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{1, −3, −3, −1, −3, −3, −1, 3, −3, 3, −1, −1},
{−1, −3, −1, 3, 3, −3, −3, 3, −1, −1, −3, −1}, {−1, 1, 3, 3, 3, 1, −1, 1, −3, 1, −1, −3},
{1, 3, 1, 1, −3, 3, 1, 3, 3, −1, 1, −1}.

When the sequence $\{x_n\}$ meets the condition 2 and $\{Z_i\}$ is {0 6 4 4 2 0}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{1, 3, −1, 1, 1, 3, 1, −1, −3, 3, −3, 3},
{−1, 1, 1, 3, −1, 1, −1, −3, −1, −3, 3, 1},
{−1, 3, 3, −1, 3, −1, 1, 1, 3, 3, 1, 1},
{−3, 3, −3, 3, 1, −1, −1, 1, −3, −1, −1, 1}.

When the sequence $\{x_n\}$ meets the condition 2 and $\{Z_i\}$ is {2 6 6 4 4 0}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{3, −3, −3, −3, 1, 3, −3, 1, 3, 1, −1, 3},
{−3, −3, −1, −3, 3, 3, 1, 3, −1, 3, 3, −3}.

When the sequence $\{x_n\}$ meets the condition 2 and $\{Z_i\}$ is {6 2 2 4 4 0}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
{−3, 1, 3, 1, −1, 3, 3, −3, −3, −3, 1, 3},
{3, 1, −3, −3, −3, 3, 3, −1, 1, 3, 1, −3}.

When the sequence $\{x_n\}$ meets the condition 2 and $\{Z_i\}$ is {6 6 2 4 0 0}, $\{s_n\}=\{s0, s_1, s_2, s_3, s_4, s_5, s_6, s_7, s_8, s_9, s_{10}, s_{11}\}$ is one of the following sequences or one of equivalent sequences of the following sequences:
{−3, −3, 3, −3, −1, −1, 3, 1, 1, −3, 1, −1},
{−3, 3, 3, 3, −1, −3, −3, 1, 3, −3, 3, −1}.

When the sequence $\{x_n\}$ meets the condition 2 and $\{Z_i\}$ is {2 2 6 4 0 0}, $\{s_n\}=\{s_0, s_1, s_2, s_3, s_4, s_5, s_6, s_7, s_8, s_9, s_{10}, s_{11}\}$ is one of the following sequences or one of equivalent sequences of the following sequences:
1−1, 3, 1, 3, −3, 1, 1, −1, 3, 3, 3, 11,
{−3, 3, 3, −1, 3, 1, 1, 1, −1, 1, 3, 3}.

In this application, an equivalent sequence of $\{s_n\}$ that includes 12 elements is $\{q_n\}$, where $q_n = s_n + u_n \pmod{8}$, $0 \le n \le 11$. and a sequence is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

In an example, before operation 301, the method further includes: selecting, by the transmit device, the sequence $\{x_n\}$ from a sequence set J. The set J is a set of a preset available sequence $\{x_n\}$ in a communications system, the set J includes a plurality of sequences, and the plurality of sequences include at least one sequence that meets the condition 1 or the condition 2 or the condition 3; or the set J includes a plurality of sequences that meet the condition 1 or the condition 2 or the condition 3. For any sequence in the set J, the set J does not include any equivalent sequence of the sequence.

Because a plurality of cells coexist in the communications system, neighboring cells need to use different sequences to transmit data. Therefore, the sequence set J is required, so that neighboring cells can use different sequences in the sequence set J to reduce interference between the cells. For example, the transmit device selects the sequence $\{x_n\}$ according to a predefined rule by using a cell ID as an input parameter, or when the transmit device is UE, the transmit device obtains, based on signaling configured on a base station, the sequence $\{x_n\}$ used for sending. In one embodiment, any equivalent sequence of $\{x_n\}$ does not belong to the sequence set J. Because a sequence is highly cross-correlated with its own equivalent sequence, if the set J includes both a sequence and its equivalent sequence, and neighboring cells respectively use a sequence and one of its equivalent sequences, interference between two cells is severe when the two cells use the two sequences to send data on a same resource.

In part 302, the transmit device maps the sequence $\{f_n\}$ to 2×N subcarriers.

In an example, the transmit device sequentially maps 2N elements of $\{f_n\}$ to 2N subcarriers in descending order of subcarrier indexes, where one element of $\{f_n\}$ is mapped to one frequency domain subcarrier, and the frequency domain subcarrier is a smallest unit of frequency domain resources and used to carry data information. In one embodiment, the transmit device maps 2N elements of $\{f_n\}$ to 2N subcarriers in ascending order of subcarrier indexes. Mapping one element in $\{f_n\}$ to one subcarrier is carrying the element on the subcarrier. After the mapping, the transmit device sends data through radio frequency, which is equivalent to sending the element on the subcarrier. A communications system usually includes 2M subcarriers, where M>N. Different transmit devices may occupy different subcarriers to send data. The 2N subcarriers is a part of the 2M subcarriers, and locations of the 2N subcarriers in the 2M subcarriers may be predefined or configured through signaling by a base station.

In an example, FIG. 3b to FIG. 3e show four ways of mapping $\{f_n\}$ to subcarriers in part 302. In an example of FIG. 3b to FIG. 3e, 2N=12.

Figure 3B:
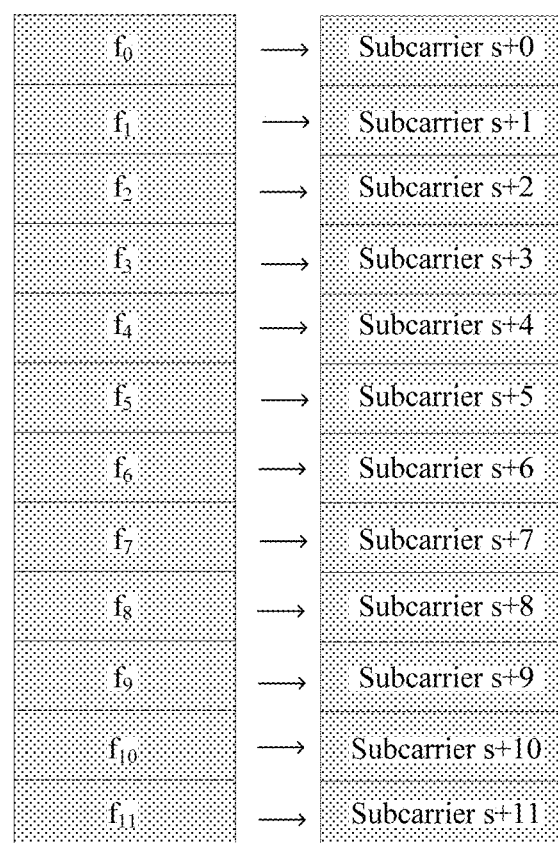
FIG. 3b is a schematic diagram of mapping a sequence $\{f_n\}$ to a subcarrier according to an embodiment of this application.

As shown in FIG. 3b, the transmit device maps $\{f_n\}$ to 2×N contiguous subcarriers. $f_0$ to $f_{11}$ are respectively mapped to 12 contiguous subcarriers s+0, s+1, s+2, s+3, s+4, s+5, s+6, s+7, s+8, s+9, s+10, and s+11. In one embodiment, $f_0$ is mapped to the subcarrier s+0, $f_1$ is mapped to the subcarrier s+1, . . . , and $f_{11}$ is mapped to the subcarrier s+11. In FIG. 3b to FIG. 3e, s indicates that the first subcarrier in the 2×N subcarriers to which $\{f_n\}$ is mapped is indexed in the 2M subcarriers in the system.

Figure 3C:
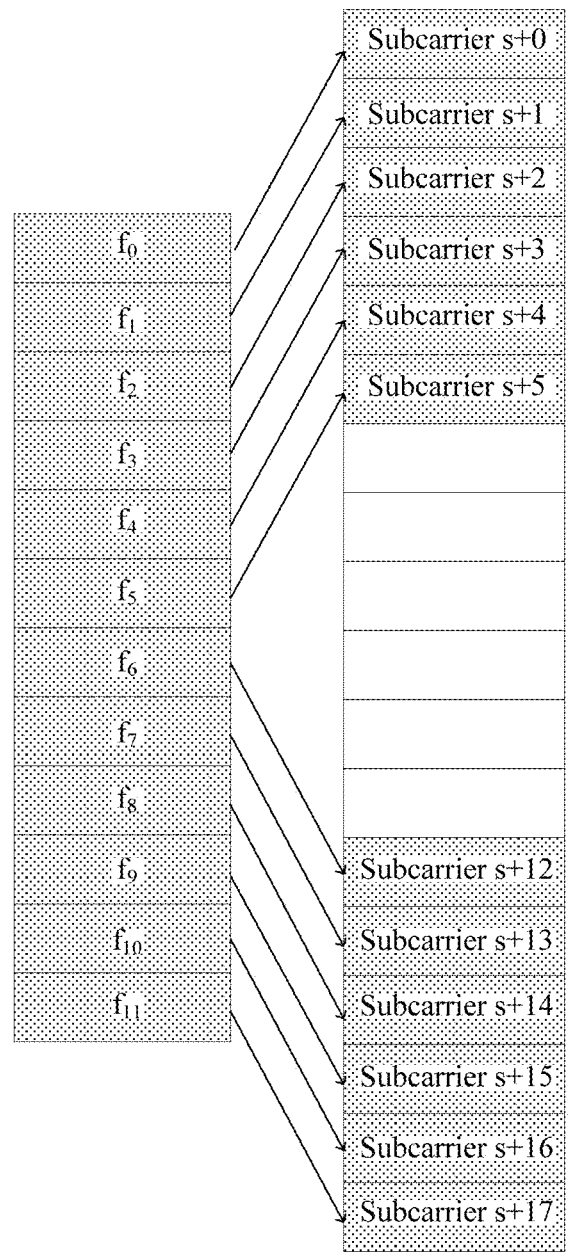
FIG. 3c is another schematic diagram of mapping a sequence $\{f_n\}$ to a subcarrier according to an embodiment of this application.

In one embodiment, the transmit device maps $\{f_n\}$ to a subcarrier group 1 and a subcarrier group 2, where the subcarrier group 1 and the subcarrier group 2 each include N contiguous subcarriers. As shown in FIG. 3c, 2N=12. $f_0$ to $f_5$ are mapped to six contiguous subcarriers s+0, s+1, s+2, s+3, s+4, s+5 (subcarriers of the subcarrier group 1), and $f_6$ to $f_{11}$ are mapped to another six contiguous subcarriers s+12, s+13, s+14, s+15, s+16, s+17 (subcarriers of the subcarrier group 2). In addition, the subcarrier group 1 and the subcarrier group 2 are separated by at least one subcarrier. For example, in FIG. 3c, if $f_5$ is mapped to the subcarrier s+5, $f_6$ cannot be mapped to a subcarrier s+6. In other words, the subcarrier group 1 cannot be adjacent to the subcarrier group 2, and they are separated by at least one subcarrier that belongs to neither the subcarrier group 1 nor the subcarrier group 2. In one embodiment, when the subcarrier group 1 and the subcarrier group 2 each have N subcarriers, the subcarrier group 1 and the subcarrier group 2 are separated by at least N−1 subcarriers, where N is an integer greater than 1. In this way, lower PAPR/CM can be obtained. In addition, better frequency diversity effect is obtained.

Figure 3D:
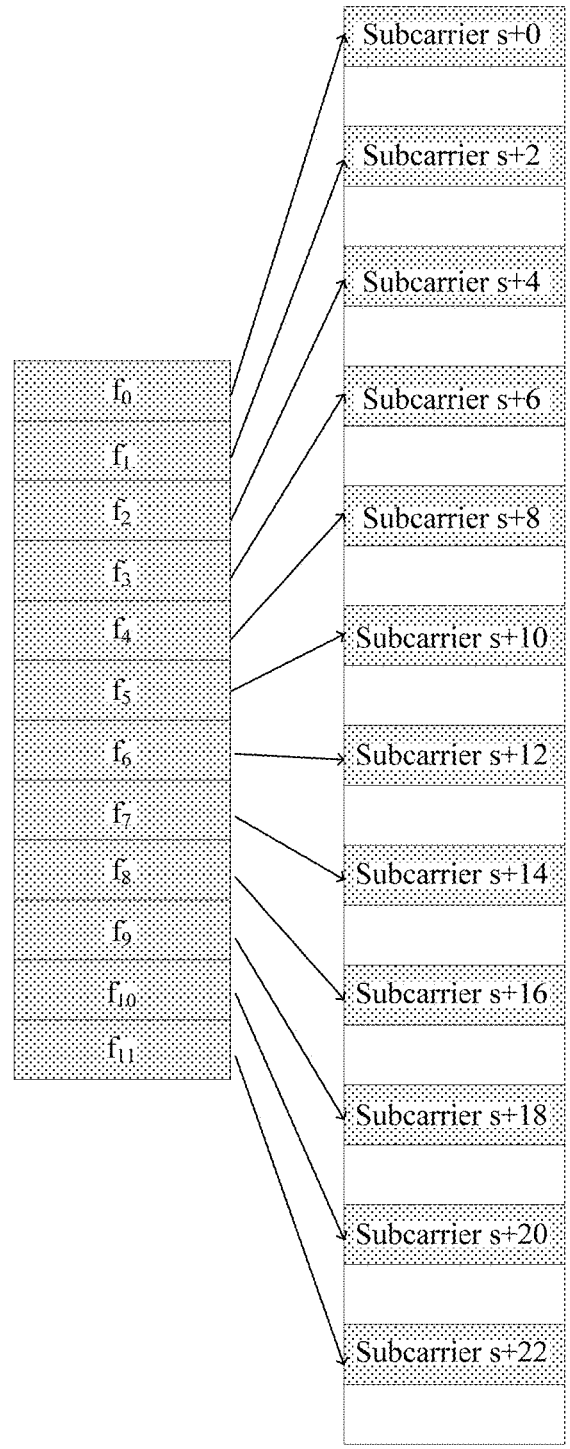
FIG. 3d is still another schematic diagram of mapping a sequence $\{f_n\}$ to a subcarrier according to an embodiment of this application.

In one embodiment, the transmit device maps $\{f_n\}$ to 2×N noncontiguous and equally gapped subcarriers. In one embodiment, a gap is one subcarrier. As shown in FIG. 3d, the 2N subcarriers are distributed at equal gaps in frequency domain. For example, in FIG. 3c, a subcarrier to which $f_n$ is mapped and a subcarrier to which $f_{n+1}$ is mapped are separated by one subcarrier. $f_0$ to $f_{11}$ are respectively mapped to 12 equally gapped subcarriers s+0, s+2, s+4, s+6, s+8, s+10, s+12, s+14, s+16, s+18, s+20, and s+22.

Figure 3E:
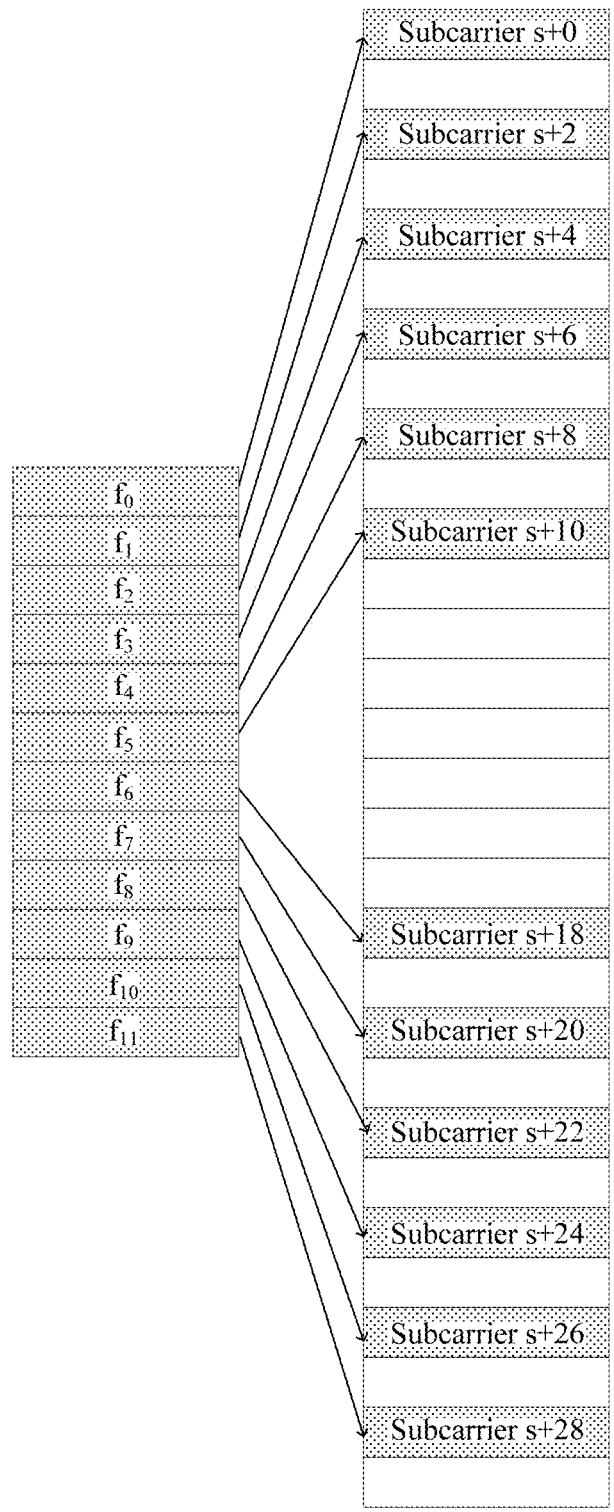
FIG. 3e is yet another schematic diagram of mapping a sequence $\{f_n\}$ to a subcarrier according to an embodiment of this application.

In one embodiment, the transmit device maps $\{f_n\}$ to a subcarrier group 1 and a subcarrier group 2, where the subcarrier group 1 and the subcarrier group 2 each include N noncontiguous and equally gapped subcarriers, and the subcarrier group 1 and the subcarrier group 2 are separated by at least one subcarrier. In one embodiment, neighboring subcarriers in a subcarrier group (the group 1 or the group 2) are separated by one subcarrier. As shown in FIG. 3e, $f_0$ to $f_5$ are mapped to six equally gapped subcarriers s+0, s+2, s+4, s+6, s+8, s+10 in the subcarrier group 1, and $f_6$ to $f_{11}$ are mapped to s+18, s+20, s+22, s+24, s+26, s+28 in the subcarrier group 2. In one embodiment, when the subcarrier group 1 and the subcarrier group 2 each have N subcarriers, the subcarrier group 1 and the subcarrier group 2 are separated by at least N−1 subcarriers, where N is an integer greater than 1. In this way, lower PAPR/CM can be obtained. In addition, better frequency diversity effect is obtained.

That the subcarrier group 1 and the subcarrier group 2 are separated by X subcarriers refer to a minimum quantity of subcarriers between two subcarriers that respectively belong to the subcarrier group 1 and the subcarrier group 2. As shown in FIG. 3c, the subcarrier group 1 and the subcarrier group 2 are separated by six subcarriers.

FIG. 3b and FIG. 3d show a way of mapping $\{f_n\}$ to contiguous or equally gapped subcarriers, where a CM value is more satisfactory. FIG. 3c and FIG. 3e show a way of mapping $\{f_n\}$ to two subcarrier groups, where the CM value is higher than that in the way shown in FIG. 3b and FIG. 3d but frequency diversity effect is better.

In one embodiment, when 2N=12, and $\{f_n\}$ is mapped to two subcarrier groups (as shown in FIG. 3c and FIG. 3e), $\{s_n\}=\{s_0, s_1, s_2, s_3, s_4, s_5, s_6, s_7, s_8, s_9, s_{10}, s_{11}\}$ in $\{f_n\}$ is one of sequences in a set P12 or one of equivalent sequences of the sequences in the set P12.

The set P12 is a set of the following sequences:
{3, 3, −3, −1, 3, −1, 3, −1, −3, 3, 3, 3}
{1, −1, 1, −3, −3, −1, 1, 3, 1, 1, −3, 3};
{−3, −1, 1, 1, 1, −1, −3, 3, 1, −3, 1, 3};
{−3, −1, 3, −1, −3, 3, −3, 3, 3, 3, −3, −1};
{3, 1, 3, 1, −1, −3, 3, −3, −3, −1, 3, −3};
{3, 1, −1, −3, −1, −3, −3, 3, 1, 3, 3, −3};
{1, 3, −1, 1, 1, 3, 1, −1, −3, 3, −3, 3};
{−1, 1, 1, 3, −1, 1, −1, −3, −1, −3, 3, 1};
{1, −3, −3, −1, −3, −3, −1, 3, −3, 3, −1, −1};
{−1, −3, −1, 3, 3, −3, −3, 3, −1, −1, −3, −1};
{3, 1, 3, −1, 1, −1, −3, −3, 1, −1, 1};
{3, 3, −3, −1, 3, −1, 1, 1, −1, −3, 1}.

When $\{f_n\}$ is mapped to two subcarrier groups in the foregoing way, the CM/PAPR value is quite satisfactory.

Because a frequency domain bandwidth of the transmit end includes 2M subcarriers, all subcarriers except 2N subcarriers, namely (2M−2N) frequency domain subcarriers, need to be filled with 0 or other data to generate 2M point signals.

In part 303, the transmit device converts the generated 2M point signals (2M point frequency domain signals) into time domain signals through IFFT, and adds cyclic prefixes to the time domain signals to generate sending signals. In part 303, the time domain signals obtained by performing IFFT on the generated 2M point frequency domain signals are sent on one OFDM symbol. In part 304, the transmit device sends the sending signal out through radio frequency. In one embodiment, the terminal device sends, on the 2×N subcarriers, a signal that carries the sequence $\{f_n\}$.

In an example, the transmit device sends, on one OFDM symbol, a signal that carries $\{f_n\}$. The transmit device may alternatively send, on a plurality of OFDM symbols, the signal that carries $\{f_n\}$.

In an example, the transmit device is a terminal device. The sending signal is sent over a PUCCH.

Figure 4:
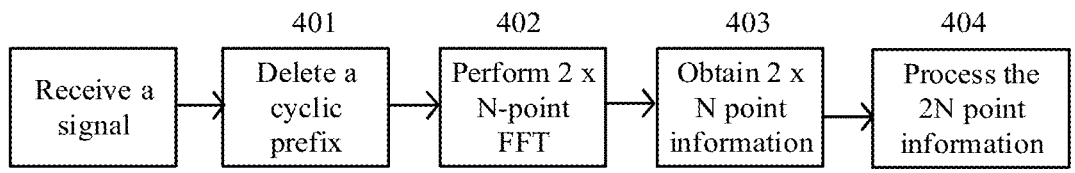
FIG. 4 is a schematic flowchart of data receiving according to an embodiment of this application.

In an example, FIG. 4 is a schematic flowchart of a data processing method at a receive end according to an embodiment of this application.

In part 401, a receive device obtains a time domain signal and deletes a cyclic prefix.

In part 402, the receive device performs 2×M-point FFT on the signal with the cyclic prefix deleted, to obtain 2×M point frequency domain signals.

In part 403, the receive device receives a signal on 2×N subcarriers, where the signal is a sequence $\{w_n\}$ that includes 2×N elements, and 0≤n≤2×N−1. For example, the receive device receives the signal on the 2×N subcarriers based on locations of the 2×N subcarriers in 2×M subcarriers, where the locations are predefined or are configured by a base station.

In part 404, the receive device processes the obtained signal on the 2×N subcarriers.

In an example, the receive device obtains 2×N elements of a sequence $\{f'_n\}$, where $f'_n$ is an element of $\{f'_n\}$, N is a positive integer and an even number, n is an integer, and 0≤n≤2×N−1. The receive device processes the signal on the 2×N subcarriers based on 2×N elements of a sequence $\{x_n\}$. $\{f'_n\}$ is as follows:
when n is an odd number, $f'_n = A_3 \cdot x_n \cdot \exp(2\pi \cdot j \cdot \alpha' \cdot n)$;
when n is an even number, $f'_n = A_4 \cdot x_n \cdot \exp(2\pi \cdot j \cdot \alpha' \cdot n)$, where $A_3$ and $A_4$ are non-zero complex numbers, $\alpha'$ is a real number, $j=\sqrt{-1}$, $\exp(j \times h)$ represents $e^{j \times h}$, and h is any real number.

A value of $A_3$ may be a value in a value range of $A_1$, or $A_3$ may be equal to 1. A value of $A_4$ may be a value in a value range of $A_2$, or $A_4$ may be equal to 1. $\alpha'$ may be equal to $\alpha$, or may be equal to 0.

Figure 4A:
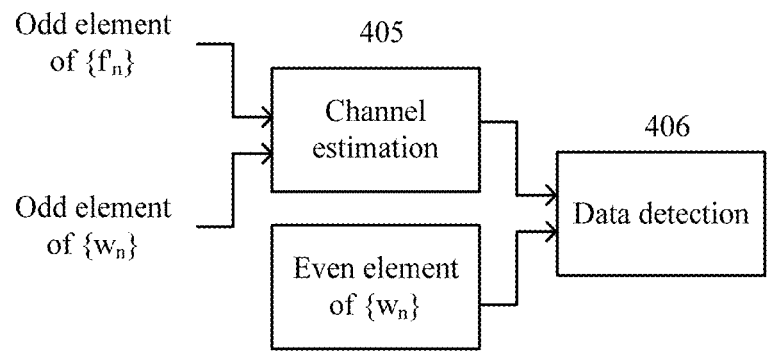
FIG. 4a is a schematic diagram of data detection by a receive end according to an embodiment of this application.
Figure 4B:
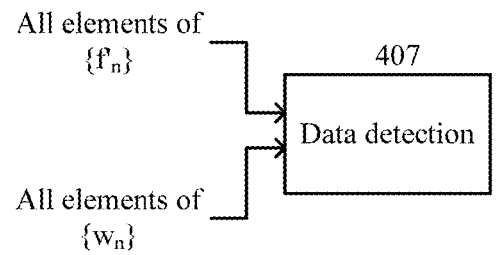
FIG. 4b is another schematic diagram of data detection by a receive end according to an embodiment of this application.
Figure 4C:
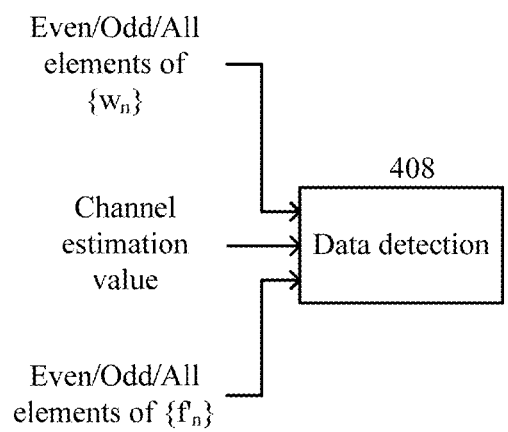
FIG. 4c is still another schematic diagram of data detection by a receive end according to an embodiment of this application.

For part 404, designs shown in FIG. 4a, FIG. 4b, and FIG. 4c are provided.

As shown in part 405 of FIG. 4a, when an odd element of $\{f_n\}$ at the transmit end is a reference signal, the receive end device obtains $\{f'\ \}$ based on $A_3=1$. The receive device performs joint processing on an odd element of $\{f'_n\}$ and an odd element of $\{w_n\}$, and obtains a channel status corresponding to the received sequence. For example, an odd element pair of $x_n$ is correlated by using an odd element of a received sequence, and then a channel status is obtained. In this case, an even element of $\{f_n\}$ at the transmit end carries data information. The data information may be service data information, or may be control information.

In part 406 of FIG. 4*a*, the receive device performs joint processing on an even element of $\{f_n\}$ and the obtained channel status, and obtains data information. For example, frequency domain equalization is performed on an even element of a received sequence based on a channel status, to obtain data transmitted by a transmit device.

In FIG. 4*a*, channel estimation is performed by using an odd element of $\{f_n\}$ as an example. When an even element of $\{f_n\}$ is a reference signal, channel estimation and subsequent processing are similar to those in FIG. 4*a*. Details are not described again.

In one embodiment, FIG. 4*b* shows another example of processing the obtained signal on the 2×N subcarriers by the receive device. In part 407, the receive device traverses all possible sequences of $\{f'_n\}$ with respect to all possible values of $A_1$ and all possible values of $A_2$. $\{w_n\}$ is separately correlated with all possible sequences of $\{f_n\}$, and maximum likelihood comparison is performed, to obtain data transmitted by the transmit device.

For example, a value range corresponding to $A_1$ is $\{-1, +1\}$, and a value range corresponding to $A_2$ is $\{-1, +1\}$, and a value combination of $(A_1, A_2)$ is $\{(-1, -1), (-1, 1), (1, -1), (1, 1)\}$. According to FIG. 3*a*, when $(A_3, A_4)$ is $(-1, -1)$, an obtained $\{f'_n\}$ is a sequence $\{f'_{1,n}\}$; when $(A_3, A_4)$ is $(-1, 1)$, the obtained $\{f'_n\}$ is a sequence $\{f'_{2,n}\}$; when $(A_3, A_4)$ is $(1, -1)$, the obtained $\{f'_n\}$ is a sequence $\{f'_{3,n}\}$; and when $(A_3, A_4)$ is $(1, 1)$, the obtained $\{f'_n\}$ is a sequence $\{f'_n\}$. After $\{w_n\}$ is separately correlated with $\{f'_n\}$ and $\{f'_{4,n}\}$, four correlation values are obtained. A value of $(A_3, A_4)$ corresponding to a largest correlation value is the data obtained by the receive device. For example, if the largest correlation value is obtained by correlating $\{w_n\}$ with $\{f'_{1,n}\}$, $(A_1, A_2)$ is $(-1, -1)$.

In one embodiment, FIG. 4*c* shows another example of processing the obtained signal on the 2×N subcarriers by the receive device. $A_1$ and $A_2$ are modulated symbols obtained after data information bits or control information bits are modulated. In part 408, the receive device correlates all elements of $\{f'_n\}$ with all elements of $\{w_n\}$ by using an obtained channel estimation value, to obtain the foregoing data information bits or control information bits. Alternatively, the receive device performs joint processing on the odd-/even-numbered element of $\{f'_n\}$ and the odd-/even-numbered element of $\{w_n\}$ to directly obtain data transmitted by the transmit device. For example, correlation detection is performed by using $\{f'_n\}$, to obtain the data transmitted by the transmit device. The foregoing channel estimation value may be obtained based on a reference signal in another OFDM symbol.

Table 2 lists a result of CM value comparison between a sequence in this application and an LTE sequence (where each sequence includes 12 elements). As listed in Table 2, a maximum CM value of the sequence in this application is far less than that of the LTE sequence, and 77% of CM values of the LTE sequence are greater than 2 dB. CM values of the sequence in this application are better than those of the LTE sequence.

TABLE 2

CM value comparison between a sequence in this application and an LTE sequence

| CM value | Sequence of a set P25 in this application | LTE sequence |
|---|---|---|
| Maximum value | 1.1 dB | 3.78 dB |
| Minimum value | 0.83 dB | 0.92 dB |

A formula for calculating a CM value is as follows:

$$CM = \frac{20 \log_{10}\{\mathrm{rms}|v_{norm}^3(t)|\} - ref_{dB}}{k}$$

$$\mathrm{rms}(x) = \sqrt{\frac{x'x}{N}}, \quad v_{norm}(t) = \frac{|v(t)|}{\mathrm{rms}(v(t))}$$

$$K = 1.54, \quad ref_{dB} = 1.52.$$

$x'x$ represents conjugate transpose of a column vector x times a sequence x, and N is a sequence length. $1(t)$ is a signal used to calculate CM. For each sample oft, a column vector x of the sample is obtained.

Therefore, the data processing method in wireless communication provided in the embodiments of this application can decrease a CM/PAPR value of a transmitted signal of an OFDM system, thereby improving link quality of an entire transmission system.

Figure 5:
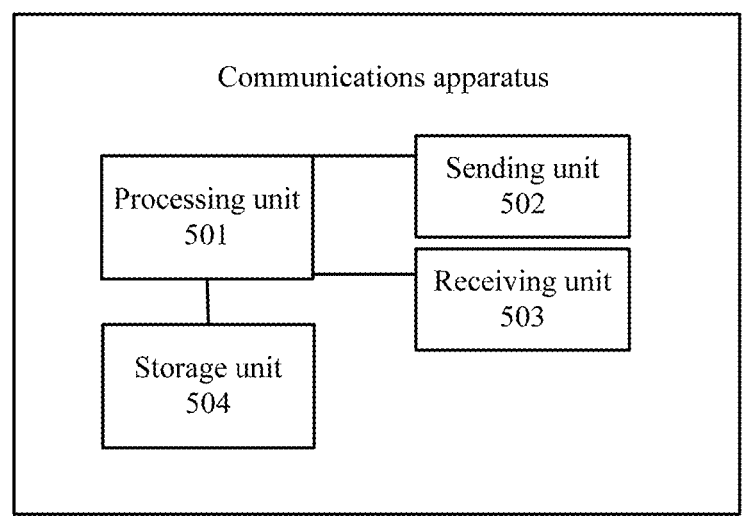
FIG. 5 is a schematic structural diagram of a data sending device according to an embodiment of this application.

As shown in FIG. 5, one embodiment of the disclosure provides a communications apparatus. The communications apparatus can be applied in the communications system shown in FIG. 1 to implement the method in the corresponding embodiment shown in FIG. 2, FIG. 3*a*, FIG. 3*b*, FIG. 3*c*, FIG. 3*d*, FIG. 3*e*, FIG. 4, FIG. 4*a*, FIG. 4*b*, or FIG. 4*c*. The communications apparatus may be the network device 20 in FIG. 1, or may be the terminal device 10 in FIG. 1. The communications apparatus may be a transmit device, or may be a receive device.

When the communications apparatus is a transmit device, the communications apparatus includes:

a processor unit 501, configured to determine a sequence $\{f_n\}$ that includes 2×N elements, where $f_n$ is an element of $\{f_n\}$, N is a positive integer and an even number, n is an integer, and $0 \leq n \leq 2\times N-1$.

The processing unit 501 is further configured to map the sequence $\{f_n\}$ to 2×N subcarriers, where the sequence $\{f_n\}$ is as follows:

when n is an odd number, $f_n = A_1 \cdot x_n \cdot \exp(2\pi \cdot j \cdot \alpha \cdot n)$;

when n is an even number, $f_n = A_2 \cdot x_n \cdot \exp(2\pi \cdot j \cdot \alpha \cdot n)$; where $A_1$ and $A_2$ are non-zero complex numbers, $\alpha$ is a real number, $j = \sqrt{-1}$, $\exp(j \times h)$ represents $e^{j \times h}$, and h is any real number.

$\{x_n\}$ is a sequence including $x_n$, and meets at least one of the condition 1 and the condition 2 in the foregoing embodiment.

The communications apparatus further includes a sending unit 502, configured to send, on the 2×N subcarriers, a signal that carries the sequence $\{f_n\}$.

In an example, the processing unit 501 is further configured to map $\{f_n\}$ to 2×N contiguous subcarriers. In one embodiment, the processing unit 501 is further configured to map $\{f_n\}$ to 2×N equally gapped subcarriers. In one embodiment, the processing unit 501 is further configured to map $\{f_n\}$ to a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier. In one embodiment, the processing unit 501 is further configured to map $\{f_n\}$ to a subcarrier group 1 and a subcarrier group 2, where the subcarrier group 1 and the subcarrier group 2 each include N equally gapped subcarriers, and the subcarrier group 1 and the subcarrier group 2 are separated by at least one subcarrier.

In an example, the communications apparatus further includes a storage unit 504, where the memory is configured to couple with the processor 501, and store a program instruction and data for the communications apparatus.

Alternatively, when the communications apparatus is a transmit device, the communications apparatus includes:

a processor unit 501, configured to determine a sequence $\{f_n\}$ that includes 2×N elements, where $f_n$ is an element of $\{f_n\}$, N is a positive integer and an even number, n is an integer, and $0 \leq n \leq 2 \times N - 1$, where N=6.

The processing unit 501 is further configured to map the sequence $\{f_n\}$ to 2×N subcarriers, where the sequence $\{f_n\}$ is as follows:

when n is an odd number, $f_n = A_1 \cdot x_n \cdot \exp(2\pi \cdot j \cdot \alpha \cdot n)$;

when n is an even number, $f_n = A_2 \cdot x_n \cdot \exp(2\pi \cdot j \cdot \alpha \cdot n)$, where $A_1$ and $A_2$ are non-zero complex numbers, a is a real number, $j = \sqrt{-1}$, $\exp(j \times h)$ represents $e^{j \times h}$, and h is any real number; and $\{x_n\}$ is a sequence that meets the following conditions: an element $x_n$ in $\{x_n\}$ meets:

$x_n = u \cdot \exp(\pi \cdot j \cdot s_n / 4)$, where u is a non-zero complex number, $\{s_n\}$ is a sequence including $s_n$, and the sequence $\{s_n\} = \{s_0, s_1, s_2, s_3, s_4, s_5, s_6, s_7, s_8, s_9, s_{10}, s_{11}\}$ is one of sequences of a set P25 in the foregoing embodiment or one of equivalent sequences of the sequences of the set P25.

The communications apparatus further includes a sending unit 502, configured to send, on the 2×N subcarriers, a signal that carries the sequence $\{f_n\}$.

In an example, the processing unit 501 is further configured to map $\{f_n\}$ to 2×N contiguous subcarriers.

In one embodiment, the processing unit 501 is further configured to map $\{f_n\}$ to 2×N noncontiguous and equally gapped subcarriers.

In one embodiment, the processing unit 501 is further configured to map $\{f_n\}$ to a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier.

In one embodiment, the processing unit 501 is further configured to map $\{f_n\}$ to a subcarrier group 1 and a subcarrier group 2, where the subcarrier group 1 and the subcarrier group 2 each include N noncontiguous and equally gapped subcarriers, and the subcarrier group 1 and the subcarrier group 2 are separated by at least one subcarrier.

In one embodiment, the subcarrier group 1 and the subcarrier group 2 are separated by at least N−1 subcarriers.

In an example, the communications apparatus further includes a storage unit 504, where the memory is configured to couple with the processor 501, and store a program instruction and data for the communications apparatus.

When the communications apparatus is a receive device, the communications apparatus includes:

a receiving unit 503, configured to receive a signal on 2×N subcarriers.

The processing unit 501 is configured to: obtain 2×N elements of a sequence $\{f'_n\}$, where $f'_n$ is an element of $\{f'_n\}$, N is a positive integer and an even number, n is an integer, and $0 \leq n \leq 2 \times N - 1$; and process the signal on the 2×N subcarriers based on the 2×N elements of the sequence $\{f'_n\}$;

where $\{f'_n\}$ is as follows:

when n is an odd number, $f'_n = A_3 \cdot x_n \cdot \exp(2\pi \cdot j \cdot \alpha' \cdot n)$;

when n is an even number, $f'_n = A_4 \cdot x_n \cdot \exp(2\pi \cdot j \cdot \alpha' \cdot n)$, where $A_3$ and $A_4$ are non-zero complex numbers, $\alpha'$ is a real number, $j = \sqrt{-1}$, $\exp(j \times h)$ represents $e^{j \times h}$, and h is any real number; and $\{x_n\}$ is a sequence including $x_n$, and meets at least one of the condition 1 and the condition 2 in the foregoing embodiment.

In an example, the receiving unit 503 is further configured to receive, on 2×N contiguous subcarriers, the signal on the 2×N subcarriers. Alternatively, the receiving unit 503 is further configured to receive, on 2×N noncontiguous and equally gapped subcarriers, the signal on the 2×N subcarriers. Alternatively, the receiving unit 503 is further configured to obtain the signal from a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier. Alternatively, the receiving unit 503 is further configured to obtain the signal from a subcarrier group 1 and a subcarrier group 2, where the subcarrier group 1 and the subcarrier group 2 each include N equally gapped subcarriers, and the subcarrier group 1 and the subcarrier group 2 are separated by at least one subcarrier.

In an example, the communications apparatus further includes a storage unit 504, where the memory is configured to couple with the processor 501, and store a program instruction and data for the communications apparatus.

Alternatively, when the communications apparatus is a receive device, the communications apparatus includes:

a processing unit 501, configured to obtain a signal on 2×N subcarriers.

The processing unit 501 is configured to: obtain 2×N elements of a sequence $\{f'_n\}$, where $f'_n$ is an element of $\{f'_n\}$, N is a positive integer and an even number, n is an integer, and $0 \leq n \leq 2 \times N - 1$; and process the signal on the 2×N subcarriers based on the 2×N elements of the sequence $\{f'_n\}$;

where $\{f'_n\}$ is as follows:

when n is an odd number, $f'_n = A_3 \cdot x_n \cdot \exp(2\pi \cdot j \cdot \alpha' \cdot n)$;

when n is an even number, $f'_n = A_4 \cdot x_n \cdot \exp(2\pi \cdot j \cdot \alpha' \cdot n)$, where $A_3$ and $A_4$ are non-zero complex numbers, $\alpha'$ is a real number, $j = \sqrt{-1}$, $\exp(j \times h)$ represents $e^{j \times h}$, and h is any real number.

$\{x_n\}$ is a sequence that meets the following conditions: an element x in $\{x_n\}$ meets:

$$x_n = u \cdot \exp(\pi \cdot j \cdot s_n / 4),$$

$\{s_n\}$ is a sequence including $s_n$, and the sequence $\{s_n\} = \{s_0, s_1, s_2, s_3, s_4, s_5, s_6, s_7, s_8, s_9, s_{10}, s_{11}\}$ is one of sequences of a set P25 in the foregoing embodiment or one of equivalent sequences of the sequences of the set P25.

The communications apparatus further includes a receiving unit 503, configured to receive a signal. The processing unit 501 is further configured to obtain the signal on the 2×N subcarriers based on the received signal.

In an example, the receiving unit 503 is further configured to receive the signal on 2×N contiguous subcarriers. Alternatively, the receiving unit 503 is further configured to receive the signal on 2×N equally gapped subcarriers.

Alternatively, the receiving unit 503 is further configured to receive the signal from a subcarrier group 1 and a subcarrier group 2, where the subcarrier group 1 and the subcarrier group 2 each include N contiguous subcarriers, and the subcarrier group 1 and the subcarrier group 2 are separated by at least one subcarrier. In one embodiment, the subcarrier group 1 and the subcarrier group 2 are separated by at least N−1 subcarriers.

Alternatively, the receiving unit 503 is further configured to receive the signal from a subcarrier group 1 and a subcarrier group 2, where the subcarrier group 1 and the subcarrier group 2 each include N equally gapped subcarriers, and the subcarrier group 1 and the subcarrier group 2 are separated by at least one subcarrier. In one embodiment, the subcarrier group 1 and the subcarrier group 2 are separated by at least N−1 subcarriers.

In an example, the communications apparatus further includes a storage unit 504, where the memory is configured to couple with the processor 501, and store a program instruction and data for the communications apparatus.

For other features of sequences $\{x_n\}$ and $\{f_n\}$, $A_1$, $A_2$, and the like, refer to description about the foregoing embodiments. Details are not described again.

Therefore, the communications apparatus for wireless communications provided in this embodiment of this application decreases a CM value of a transmitted signal of an OFDM system, thereby improving link quality of an entire transmission system.

Figure 6:
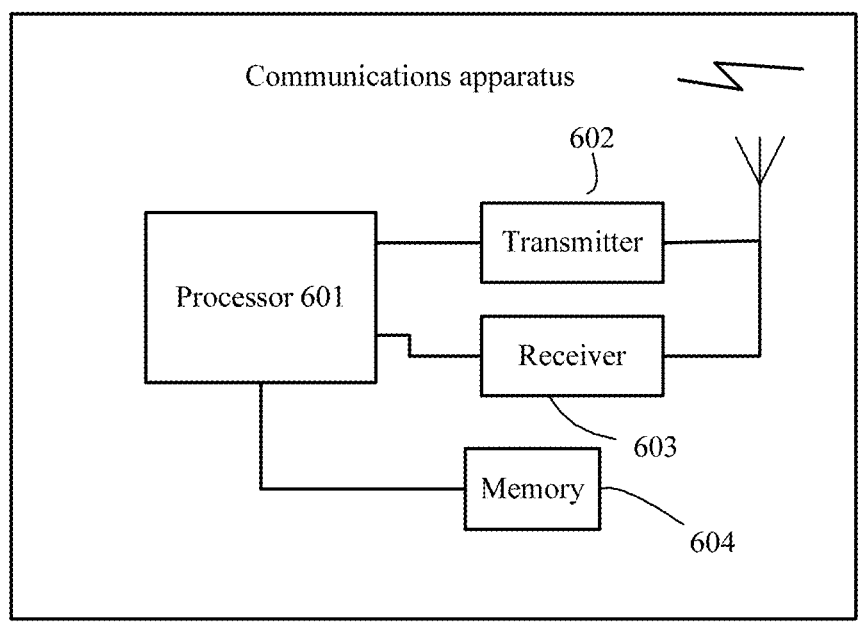
FIG. 6 is a schematic structural diagram of another data receiving device according to an embodiment of this application.

FIG. 6 is a possible schematic structural diagram of a communications apparatus in the foregoing embodiment.

The communications apparatus includes a processor 601 and a memory 604, where the storage unit 604 stores an instruction and the instruction is used to make the processor 601 execute the method involved in the foregoing embodiment.

The communications apparatus further includes a transmitter 602 and a receiver 603. When the communications apparatus sends a signal, the to-be-sent signal is transmitted by 602 through an antenna. When the communications apparatus receives a signal, the receiver 603 receives the signal from an antenna.

The communications apparatus can be applied in the communications system shown in FIG. 1 to implement the method in the corresponding embodiment shown in FIG. 2, FIG. 3a, FIG. 3b, FIG. 3c, FIG. 3d, FIG. 4, FIG. 4a, FIG. 4b, or FIG. 4c. The communications device may be the network device 20 in FIG. 1, or may be the terminal device 10 in FIG. 1. The communications apparatus may be a transmit device, or may be a receive device.

A function of the processing unit 501 in FIG. 5 may be implemented by the processor 601 in FIG. 6, or the processing unit 501 in FIG. 5 may be the processor 601 in FIG. 6. A function of the sending unit 502 in FIG. 5 may be implemented by the transmitter 602 in FIG. 6, or the sending unit 502 in FIG. 5 may be the transmitter 602 in FIG. 6. A function of the receiving unit 503 in FIG. 5 may be implemented by the receiver 603 in FIG. 6, or the receiving unit 603 in FIG. 5 may be the receiver 603 in FIG. 6. A function of the storage unit 504 in FIG. 5 may be implemented by the memory 604 in FIG. 6, or the storage unit 504 in FIG. 5 may be the memory 604 in FIG. 6.

It can be understood that FIG. 6 shows only a simplified design of the communications apparatus. In actual application, the communications apparatus may include any quantity of transmitters, receivers, processors, memories, and the like, and all data receiving devices that can implement this application fall within the protection scope of this application.

An embodiment of this application further provides a chip, where the chip may perform parts 301, 302, and 303 in FIG. 2, or parts 401, 402, 403, and 404 in FIG. 4, and designs in FIG. 3a, FIG. 3b, FIG. 3c, FIG. 3d, FIG. 4a, FIG. 4b, and FIG. 4c. The chip may include corresponding function units in the figures and perform corresponding functions.

The processor configured to perform functions of the communications apparatus in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The processor 601 and the memory 604 in FIG. 6 may be alternatively combined into one unit to serve as a processor to implement functions of the processor 601 and the memory 604 in FIG. 6.

Method or algorithm operations or steps described in combination with the content disclosed in the application may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a data receiving device and/or a data sending device. Certainly, the processor and the storage medium may exist in the data receiving device and/or the data sending device as discrete components.

It may be clearly understood by a person skilled in the art that, for the purpose of convenient and brief description, division of the foregoing function modules is used as an example for illustration. In actual application, the foregoing functions can be allocated to and implemented by different function modules according to a requirement, that is, an internal structure of an apparatus is divided into different function modules to implement all or some of the functions described above. For a detailed working process of the foregoing apparatus, refer to a corresponding process in the foregoing method embodiments. Details are not described herein again.

A person of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and benefits of this application are further described in detail in the foregoing embodiments. It should be understood that the foregoing descriptions are merely embodiments of this application, but are not intended to limit the protection scope of this application. Any modification, equivalent replacement or improvement made based on technical solutions of this application shall fall within the protection scope of this application.

What is claimed is:

1. A method for signal transmission in wireless communication, the method comprising:

determining a sequence $\{f_n\}$ comprising 2×N elements, wherein $f_n$ is an element of $\{f_n\}$, N is a positive integer and an even number, n is an integer, and $0 \leq n \leq 2 \times N-1$;

mapping the sequence $\{f_n\}$ to 2×N subcarriers; and sending, on the 2×N subcarriers, a signal that carries the sequence $\{f_n\}$;

wherein the sequence $\{f_n\}$ comprises:

when n is an odd number, $f_n = A_1 \cdot x_n \cdot \exp(2\pi \cdot j \cdot \alpha \cdot n)$;

when n is an even number, $f_n = A_2 \cdot x_n \cdot \exp(2\pi \cdot j \cdot \alpha \cdot n)$;

$A_1$ and $A_2$ are non-zero complex numbers, $\alpha$ is a real number, $j=\sqrt{-1}$, $\exp(j \times h)$ represents $e^{j \times h}$, and h is any real number; and $\{x_n\}$ is a sequence composed of $x_n$, and meets at least one of the following conditions:

condition 1: when n is an even number greater than or equal to 0 and less than or equal to N−1, $x_{n+N} = \alpha \times j \times x_n$;

when n is an odd number greater than or equal to 0 and less than or equal to N−1, $x_{n+N} = -\alpha \times j \times x_n$;

wherein a=1 or 1, $j=\sqrt{-1}$, and N is a positive integer and an even number; and condition 2: when N=6, $x_{2n+6} = a_n \cdot x_{2n}$, and $x_{2n+1+6} = b_n \cdot x_{2n+1}$, where $\begin{aligned} a_n &= c \cdot \exp(\pi \cdot j \cdot y_n/4) \\ b_n &= c \cdot \exp(\pi \cdot j \cdot y_{n+3}/4) \end{aligned}$, c is a non-zero complex number, $0 \leq n \leq 2$, and $\{y_0\ y_1\ y_2\ y_3\ y_4\ y_5\}$ is one of the following sequences:
{2 0 6 2 4 6},
{6 0 2 6 4 2},
{0 6 4 4 2 0},
{2 6 6 4 4 0},
{6 2 2 4 4 0},
{6 6 2 4 0 0},
{2 2 6 4 0 0},
{4 2 0 4 6 0},
{0 2 4 0 6 4},
{2 0 6 6 4 2},
{4 0 0 6 6 2},
{0 4 4 6 6 2},
{0 0 4 6 2 2},
{4 4 0 6 2 2},
{6 4 2 6 0 2},
{2 4 6 2 0 6},
{4 2 0 0 6 4},
{6 2 2 0 0 4},
{2 6 6 0 0 4},
{2 2 6 0 4 4},
{6 6 2 0 4 4},
{0 6 4 0 2 4},
{4 6 0 4 2 0},
{6 4 2 2 0 6},
{0 4 4 2 2 6},
{4 0 0 2 2 6},
{4 4 0 2 6 6},
{0 0 4 2 6 6}.

2. The method according to claim 1, wherein when N=6, an element $x_n$ of $\{x_n\}$, wherein $0 \leq n \leq 11$, meets $x_n = g \cdot \exp(\pi \cdot j \cdot s_n/4)$, wherein g is a non-zero complex number, $\{s_n\}$ is a sequence composed of $s_n$, and when $\{x_n\}$ meets the condition 1, $\{s_n\} = \{s_0, s_1, s_2, s_3, s_4, s_5, s_6, s_7, s_8, s_9, s_{10}, s_{11}\}$ is one of the following sequences or one of equivalent sequences of the following sequences:

{1, 3, 3, 1, −3, −1, 3, 1, −3, −1, −1, −3},
{−3, 1, 3, 1, −3, −3, −1, −1, −3, −1, −1,3},
{−1, 3, −1,1,3, 3, 1,1,1, −1, −3, 1},
{1, −1, −3, 1, −3, −1,3, −3, −1, −1, −1, −3},
{3, 1, −3, −3, 3, −3, −3, −1, −1,3, −3, 3}; or when the sequence $\{x_n\}$ meets the condition 2, $\{s_n\}$ meets the following conditions:

when $\{Z_i\}$ is {2 0 6 2 4 6}, $\{s_n\} = \{s_0, s_1, s_2, s_3, s_4, s_5, s_6, s_7, s_8, s_9, s_{10}, s_{11}\}$ is one of the following sequences or one of equivalent sequences of the following sequences:

{1,3, −3, 1, −3, 3, 3, −3, −3, −3, 3, 1},
{1, −3, 1, −1, −3, −3, 3, −1, 1, 3, 3, 3},
{3, −3, −3, 1, 3, 1, −1, 1, −1, −1, 3, 1},
{3, 1, 1, 1, 3, −3, −1, −3, 3, −1, 3, −3},
{3, 1, 3, 3, −1,1, −1, −1, −3, 3, −1, 1},
{3, 1, 1, 1, 3, −3, −1, −3, 3, −1, 3, −3}; or when {$Z_i$} is {6 0 2 6 4 2}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{1, −3, −3, −1, −3, −3, −1,3, −3, 3, −1, −1},
{−1, −3, −1,3, 3, −3, −3, 3, −1, −1, −3, −1},
{−1, 1, 3, 3, 3, 1, −1,1, −3, 1, −1, −3},
{1, 3, 1, 1, −3, 3, 1, 3, 3, −1, 1, −1}; or
when {$Z_i$} is {0 6 4 4 2 0}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{1, 3, −1, 1, 1, 3, 1, −1, −3, 3, −3, 3},
{−1, 1, 1, 3, −1, 1, −1, −3, −1, −3, 3, 1},
{−1, 3, 3, −1, 3, −1, 1, 1, 3, 3, 1, 1},
{−3, 3, −3, 3, 1, −1, −1, 1, −3, −1, −1, 1}; or
when {$Z_i$} is {2 6 6 4 4 0}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{3, −3, −3, −3, 1, 3, −3, 1, 3, 1, −1, 3},
{−3, −3, −1, −3, 3, 3, 1, 3, −1, 3, 3, −3}; or
when {$Z_i$} is {6 2 2 4 4 0}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{−3, 1, 3, 1, −1, 3, 3, −3, −3, −3, 1, 3},
{3, 1, −3, −3, −3, 3, 3, −1, 1, 3, 1, −3}; or
when {$Z_i$} is {6 6 2 4 0 0}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{−3, −3, 3, −3, −1, −1, 3, 1, 1, −3, 1, −1},
{−3, 3, 3, 3, −1, −3, −3, 1, 3, −3, 3, −1}; or
when {$Z_i$} is {2 2 6 4 0 0}, {$s_n$}={$s_0, s_1, s_2, s_3, s_4, s_5, s_6, s_7, s_8, s_9, s_{10}, s_{11}$} is one of the following sequences or one of equivalent sequences of the following sequences:
{−1, 3, 1, 3, −3, 1, 1, −1, 3, 3, 3, 1},
{−3, 3, 3, −1, 3, 1, 1, 1, −1, 1, 3, 3};
wherein an equivalent sequence of {$s_n$} is {$q_n$}, wherein $q_n = s_n + u_n$ (mod 8), $0 \leq n \leq 11$, and
a sequence {$u_i$} is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

3. A method for signal transmission in wireless communication, the method comprising:
determining a sequence {$f_n$} comprising 2×N elements, wherein $f_n$ is an element of {$f_n$}, N is a positive integer and an even number, n is an integer, and $0 \leq n \leq 2\times N-1$, wherein N=6;
mapping the sequence {$f_n$} to 2×N subcarriers; and
sending, on the 2×N subcarriers, a signal that carries the sequence {$f_n$};
wherein the sequence {$f_n$} is as follows:
when n is an odd number, $f_n = A_1 \cdot x_n \cdot \exp(2\pi \cdot j \cdot \alpha \cdot n)$;
when n is an even number, $f_n = A_2 \cdot x_n \cdot \exp(2\pi \cdot j \cdot \alpha \cdot n)$;
$A_1$ and $A_2$ are non-zero complex numbers, $\alpha$ is a real number, $j = \sqrt{-1}$, $\exp(j \times h)$ represents $e^{j \times h}$, and h is any real number; and
{$x_n$} is a sequence that meets the following conditions: an element $x_n$ in {$x_n$} meets:
$x_n = u \cdot \exp(\pi \cdot j \cdot s_n / 4)$, wherein u is a non-zero complex number,
{$s_n$} is a sequence composed of $s_n$,
the sequence {$s_n$}={$s_0, s_1, s_2, s_3, s_4, s_5, s_6, s_7, s_8, s_9, s_{10}, s_{11}$} is one of the following sequences or one of equivalent sequences of the following sequences:
{3, 3, −3, −1, 3, −1, 3, −1, −3, 3, 3, 3},
{1, −1, 1, −3, −3, −1, 1, 3, 1, 1, −3, 3},
{−3, −1, 1, 1, 1, −1, −3, 3, 1, −3, 1, 3},
{−3, −1, 3, −1, −3, 3, −3, 3, 3, 3, −3, −1},
{3, 1, 3, 1, −1, −3, 3, −3, −3, −1, 3, −3},
{3, 1, −1, −3, −1, −3, 3, −3, 1, 3, 3, −3},
{1, 3, −1, 1, 1, 3, 1, −1, −3, 3, −3, 3},
{−1, 1, 1, 3, −1, 1, −1, −3, −1, −3, 3, 1},
{1, −3, −3, −1, −3, −3, −1, 3, −3, 3, −1, −1},
{−1, −3, −1, 3, 3, −3, −3, 3, −1, −1, −3, −1},
{3, 1, 3, 3, −1, 1, −1, −3, −3, 1, −1, 1},
{3, 3, −3, −1, 3, −1, 1, 1, 1, −1, −3, 1},
{−3, 3, 1, 3, −3, 3, −3, −1, 1, −1, −3, −1},
{−3, 1, 3, 3, 1, 3, −1, −3, 1, 1, −1, 3},
{−1, −3, 3, −3, 3, 3, −1, 1, −1, −3, −1, 1},
{1, 3, 1, −1−3, −1, 1, −3, −3, −1, 1, −1},
{1, −1, −1, −3, −3, −3, 1, −3, −3, −1, −1, 1},
{−1, 1, −1, −3, −1, 1, 1, −1, 3, −3, −1, −3},
{3, −1, −3, −3, 1, −1, 3, −3, 3, 3, −3, 1},
{−1, 1, −1, −3, 1, 3, −1, −3, −1, 1, 3, 1},
{3, −3, 1, 3, 1, 1, 1, −3, 3, 1, −3, 3},
{3, 3, −1, −1−1, 1, 1, −1, −1, 3, −1, 3},
{1, 3, 1, 3, −1, −1, 1, −3, 1, −1, −3, 3},
{1, −3, 3, 3, 3, 1, −3, −1, 1, 1, 3, −1}, and
{−3, 3, −3, −1, 1, −3, 1, 1, 1, 3, 1, −1};
an equivalent sequence of {$s_n$} is {$q_n$}, wherein $q_n = s_n + u_n$ (mod 8), $0 \leq n \leq 11$, and
a sequence {$u_i$} is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4}, {2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

4. The method according to claim 3, wherein the mapping of the sequence $\{f_n\}$ to 2×N subcarriers comprises:
mapping $\{f_n\}$ to 2×N contiguous subcarriers; or
mapping $\{f_n\}$ to 2×N noncontiguous and equally gapped subcarriers; or
mapping $\{f_n\}$ to a subcarrier group 1 and a subcarrier group 2, wherein the subcarrier group 1 and the subcarrier group 2 each comprise N contiguous subcarriers, and the subcarrier group 1 and the subcarrier group 2 are separated by at least one subcarrier; or
mapping $\{f_n\}$ to a subcarrier group 1 and a subcarrier group 2, wherein the subcarrier group 1 and the subcarrier group 2 each comprise N noncontiguous and equally gapped subcarriers, and the subcarrier group 1 and the subcarrier group 2 are separated by at least one subcarrier.

5. The method according to claim 4, wherein
the subcarrier group 1 and the subcarrier group 2 being separated by at least one subcarrier comprises:
the subcarrier group 1 and the subcarrier group 2 being separated by at least N−1 subcarriers.

6. The method according to claim 3, wherein value ranges of $A_1$ and $A_2$ are $\{1, -1, j, -j\}$.

7. The method according claim 3, wherein
$A_1$ and $A_2$ are modulated symbols; or
$A_1$ is a modulated symbol and $A_2$ is a constant; or
$A_2$ is a modulated symbol and $A_1$ is a constant.

8. A communications apparatus comprising:
a processor and a storage unit, wherein the storage unit stores an instruction, and the instruction is used to enable the processor to perform operations comprising:
determining a sequence $\{f_n\}$ comprising 2×N elements, wherein $f_n$ is an element of $\{f_n\}$, N is a positive integer and an even number, n is an integer, and $0 \le n \le 2\times N-1$, wherein N=6;
mapping the sequence $\{f_n\}$ to 2×N subcarriers; and
sending, on the 2×N subcarriers, a signal that carries the sequence $\{f_n\}$;
wherein the sequence $\{f_n\}$ is as follows:
when n is an odd number, $f_n = A_1 \cdot x_n \cdot \exp(2\pi \cdot j \cdot \alpha \cdot n)$;
when n is an even number, $f_n = A_2 \cdot x_n \cdot \exp(2\pi \cdot j \cdot \alpha \cdot n)$;
$A_1$ and $A_2$ are non-zero complex numbers, $\alpha$ is a real number, $j=\sqrt{-1}$, $\exp(j\times h)$ represents $e^{j\times h}$, and h is any real number; and $\{x_n\}$ is a sequence that meets the following conditions: an element $x_n$ in $\{x_n\}$ meets:
$x_n = u \cdot \exp(\pi \cdot j \cdot s_n/4)$, wherein u is a non-zero complex number,
$\{s_n\}$ is a sequence composed of $s_n$,
the sequence $\{s_n\} = \{s_0, s_1, s_2, s_3, s_4, s_5, s_6, s_7, s_8, s_9, s_{10}, s_{11}\}$ is one of the following sequences or one of equivalent sequences of the following sequences:
{3, 3, −3, −1, 3, −1, 3, −1, −3, 3, 3, 3},
{1, −1, 1, −3, −3, −1, 1, 3, 1, 1, −3, 3},
{−3, −1, 1, 1, 1, −1, −3, 3, 1, −3, 1, 3},
{−3, −1, 3, −1, −3, 3, −3, 3, 3, 3, −3, −1},
{3, 1, 3, 1, −1, −3, 3, −3, −3, −1, 3, −3},
{3, 1, −1, −3, −1, −3, 3, −3, 1, 3, 3, −3},
{1, 3, −1, 1, 1, 3, 1, −1, −3, 3, −3, 3},
{−1, 1, 1, 3, −1, 1, −1, −3, −1, −3, 3, 1},
{1, −3, −3, −1, −3, −3, −1, 3, −3, 3, −1, −1},
{−1, −3, −1, 3, 3, −3, −3, 3, −1, −1, −3, −1},
{3, 1, 3, 3, −1, 1, −1, −3, −3, 1, −1, 1},
{3, 3, −3, −1, 3, −1, 1, 1, 1, −1, −3, 1},
{−3, 3, 1, 3, −3, 3, −3, −1, 1, −1, −3, −1},
{−3, 1, 3, 3, 1, 3, −1, −3, 1, 1, −1, 3},
{−1, −3, 3, −3, −3, 3, −1, 1, −1, −3, −1, 1},
{1, 3, 1, −1−3, −1, −1, −3, −3, −1, 1, −1},
{1, −1, −1, −3, −3, −3, 1, −3, −3, −1, −1, 1},
{−1, 1, −1, −3, −1, 1, 1, −1, 3, −3, −1, −3},
{3, −1, −3, −3, 1, −1, 3, −3, 3, 3, −3, 1},
{−1, 1, −1, −3, 1, 3, −1, −3, −1, 1, 3, 1},
{3, −3, 1, 3, 1, 1, 1, −3, 3, 1, −3, 3},
{3, 3, −1, −1−1, 1, 1, −1, −1, 3, −1, 3},
{1, 3, 1, 3, −1, −1, 1, −3, 1, −1, −3, 3},
{1, −3, 3, 3, 3, 1, −3, −1, 1, 1, 3, −1}, and
{−3, 3, −3, −1, 1, −3, 1, 1, 1, 3, 1, −1};
an equivalent sequence of $\{s_n\}$ is $\{q_n\}$, wherein $q_n = s_n + u_n$ (mod 8), $0 \le n \le 11$, and
a sequence $\{u_n\}$ is one of the following sequences:
{0, 0, 4, 4, 0, 0, 4, 4, 0, 0, 4, 4},
{0, 2, 0, 2, 0, 2, 0, 2, 0, 2, 0, 2},
{0, 2, 4, 6, 0, 2, 4, 6, 0, 2, 4, 6},
{0, 4, 0, 4, 0, 4, 0, 4, 0, 4, 0, 4},
{0, 4, 4, 0, 0, 4, 4, 0, 0, 4, 4, 0},
{0, 6, 0, 6, 0, 6, 0, 6, 0, 6, 0, 6},
{0, 6, 4, 2, 0, 6, 4, 2, 0, 6, 4, 2},
{2, 0, 2, 0, 2, 0, 2, 0, 2, 0, 2, 0},
{2, 0, 6, 4, 2, 0, 6, 4, 2, 0, 6, 4},
{2, 2, 2, 2, 2, 2, 2, 2, 2, 2, 2, 2},
{2, 2, 6, 6, 2, 2, 6, 6, 2, 2, 6, 6},
{2, 4, 2, 4, 2, 4, 2, 4, 2, 4, 2, 4},
{2, 4, 6, 0, 2, 4, 6, 0, 2, 4, 6, 0},
{2, 6, 2, 6, 2, 6, 2, 6, 2, 6, 2, 6},
{2, 6, 6, 2, 2, 6, 6, 2, 2, 6, 6, 2},
{4, 0, 0, 4, 4, 0, 0, 4, 4, 0, 0, 4},
{4, 0, 4, 0, 4, 0, 4, 0, 4, 0, 4, 0},
{4, 2, 0, 6, 4, 2, 0, 6, 4, 2, 0, 6},
{4, 2, 4, 2, 4, 2, 4, 2, 4, 2, 4, 2},
{4, 4, 0, 0, 4, 4, 0, 0, 4, 4, 0, 0},
{4, 4, 4, 4, 4, 4, 4, 4, 4, 4, 4, 4},
{4, 6, 0, 2, 4, 6, 0, 2, 4, 6, 0, 2},
{4, 6, 4, 6, 4, 6, 4, 6, 4, 6, 4, 6},
{6, 0, 2, 4, 6, 0, 2, 4, 6, 0, 2, 4},
{6, 0, 6, 0, 6, 0, 6, 0, 6, 0, 6, 0},
{6, 2, 2, 6, 6, 2, 2, 6, 6, 2, 2, 6},
{6, 2, 6, 2, 6, 2, 6, 2, 6, 2, 6, 2},
{6, 4, 2, 0, 6, 4, 2, 0, 6, 4, 2, 0},
{6, 4, 6, 4, 6, 4, 6, 4, 6, 4, 6, 4},
{6, 6, 2, 2, 6, 6, 2, 2, 6, 6, 2, 2}, and
{6, 6, 6, 6, 6, 6, 6, 6, 6, 6, 6, 6}.

9. The communication apparatus according to claim 8, wherein the mapping of the sequence $\{f_n\}$ to 2×N subcarriers comprises:

mapping $\{f_n\}$ to 2×N contiguous subcarriers; or mapping $\{f_n\}$ to 2×N noncontiguous and equally gapped subcarriers; or mapping $\{f_n\}$ to a subcarrier group 1 and a subcarrier group 2, wherein the subcarrier group 1 and the subcarrier group 2 each comprise N contiguous subcarriers, and the subcarrier group 1 and the subcarrier group 2 are separated by at least one subcarrier; or mapping $\{f_n\}$ to a subcarrier group 1 and a subcarrier group 2, wherein the subcarrier group 1 and the subcarrier group 2 each comprise N noncontiguous and equally gapped subcarriers, and the subcarrier group 1 and the subcarrier group 2 are separated by at least one subcarrier.

10. The communication apparatus according to claim 9, wherein the subcarrier group 1 and the subcarrier group 2 being separated by at least one subcarrier comprises:

the subcarrier group 1 and the subcarrier group 2 being separated by at least N−1 subcarriers.

11. The communication apparatus according to claim 8, wherein value ranges of $A_1$ and $A_2$ are $\{1, -1, j, -j\}$.

12. The communication apparatus according to claim 8, wherein $A_1$ and $A_2$ are modulated symbols; or $A_1$ is a modulated symbol and $A_2$ is a constant; or $A_2$ is a modulated symbol and $A_1$ is a constant.

* * * * *

UNITED STATES PATENT AND TRADEMARK OFFICE
CERTIFICATE OF CORRECTION

PATENT NO. : 10,972,236 B2  
APPLICATION NO. : 16/563368  
DATED : April 6, 2021  
INVENTOR(S) : Qu et al.

Page 1 of 1

It is certified that error appears in the above-identified patent and that said Letters Patent is hereby corrected as shown below:

In the Claims

In Claim 1, Column 28, Line 1, delete "wherein a= 1 or 1," and insert --wherein a= 1 or -1,--.

In Claim 1, Column 28, Line 10, delete "where" and insert --wherein--.

In Claim 8, Column 31, Line 65, delete "a is a real" and insert --α is a real--.

Signed and Sealed this  
Tenth Day of May, 2022

Katherine Kelly Vidal  
*Director of the United States Patent and Trademark Office*